US012743929B2

(12) United States Patent
Nelson et al.

(10) Patent No.: US 12,743,929 B2
(45) **Date of Patent: *Sep. 22, 2026**

(54) RETROFIT DEVICES FOR PROVIDING VIRTUAL TICKET-IN AND TICKET-OUT ON A GAMING MACHINE

(71) Applicant: IGT, Las Vegas, NV (US)

(72) Inventors: Dwayne R. Nelson, Las Vegas, NV (US); Steven G. LeMay, Reno, NV (US); James A. Vasquez, Carson City, NV (US); Scott T. Gowin, Reno, NV (US)

(73) Assignee: IGT, Las Vegas, NV (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/816,709

(22) Filed: Aug. 27, 2024

(65) Prior Publication Data

US 2024/0420545 A1 Dec. 19, 2024

Related U.S. Application Data

(63) Continuation of application No. 18/597,383, filed on Mar. 6, 2024, now Pat. No. 12,087,128, which is a (Continued)

(51) Int. Cl.
*G07F 17/32* (2006.01)
*G06Q 20/04* (2012.01)
(Continued)

(52) U.S. Cl.
CPC ..... *G07F 17/3251* (2013.01); *G06Q 20/0457* (2013.01); *G06Q 20/32* (2013.01);
(Continued)

(58) Field of Classification Search
None
See application file for complete search history.

(56) References Cited

U.S. PATENT DOCUMENTS 3,662,105 A 5/1972 Parks
4,071,689 A 1/1978 Talmage
(Continued)

OTHER PUBLICATIONS

U.S. Appl. No. 13/156,903, filed Jun. 9, 2011.
(Continued)

*Primary Examiner* — Omkar A Deodhar
(74) *Attorney, Agent, or Firm* — Neal, Gerber & Eisenberg LLP

(57) ABSTRACT

A gaming system compatible with patron-controlled portable electronic devices, such as smart phones or tablet computers, is described. The gaming system can include electronic gaming machines that are compatible to receive both virtual ticket vouchers and printed ticket vouchers that are redeemable for credits on the electronic gaming machines. Information associated with a virtual ticket voucher can be stored on a patron-controlled portable electronic device and then can be wireless transmitted to the electronic gaming machines. The electronic gaming machines can be configured to issue virtual ticket vouchers and printed ticket vouchers that can be redeemed for cash or additional game play on another electronic gaming machine. In one embodiment, the electronic gaming machine can be configured to issue a virtual ticket voucher to a patron-controlled portable electronic device.

22 Claims, 9 Drawing Sheets

Related U.S. Application Data continuation of application No. 18/595,928, filed on Mar. 5, 2024, now Pat. No. 12,073,689, which is a continuation of application No. 18/595,018, filed on Mar. 4, 2024, now Pat. No. 12,067,841, which is a continuation of application No. 18/529,488, filed on Dec. 5, 2023, now Pat. No. 11,954,973, which is a continuation of application No. 18/370,278, filed on Sep. 19, 2023, now Pat. No. 11,861,982, which is a continuation of application No. 17/590,547, filed on Feb. 1, 2022, now Pat. No. 11,769,371, which is a continuation of application No. 16/933,712, filed on Jul. 20, 2020, now Pat. No. 11,393,291, which is a continuation of application No. 15/178,351, filed on Jun. 9, 2016, now Pat. No. 10,720,016, which is a continuation of application No. 13/229,507, filed on Sep. 9, 2011, now Pat. No. 9,367,835.

(51) Int. Cl.
*G06Q 20/32* (2012.01)
*G06Q 30/0226* (2023.01)
*G06Q 30/08* (2012.01)
*G07F 17/42* (2006.01)

(52) U.S. Cl.
CPC ......... *G06Q 30/0226* (2013.01); *G06Q 30/08* (2013.01); *G07F 17/3223* (2013.01); *G07F 17/3239* (2013.01); *G07F 17/3241* (2013.01); *G07F 17/3244* (2013.01); *G07F 17/3255* (2013.01); *G07F 17/3267* (2013.01); *G07F 17/42* (2013.01)

(56) References Cited

U.S. PATENT DOCUMENTS

| | | | |
|---|---|---|---|
| 4,072,930 | A | 2/1978 | Lucero |
| 4,283,709 | A | 8/1981 | Lucero |
| 4,339,709 | A | 7/1982 | Brihier |
| 4,339,798 | A | 7/1982 | Hedges |
| 4,553,222 | A | 11/1985 | Kurland |
| 4,856,787 | A | 8/1989 | Itkis |
| 5,038,022 | A | 8/1991 | Lucero |
| 5,042,809 | A | 8/1991 | Richardson |
| 5,048,831 | A | 9/1991 | Sides |
| 5,179,517 | A | 1/1993 | Sarbin |
| 5,221,838 | A | 6/1993 | Gutman |
| 5,371,345 | A | 12/1994 | LeStrange |
| 5,429,361 | A | 7/1995 | Raven |
| 5,457,306 | A | 10/1995 | Lucero |
| 5,470,079 | A | 11/1995 | LeStrange |
| 5,483,049 | A | 1/1996 | Schulze, Jr. |
| 5,559,312 | A | 9/1996 | Lucero |
| 5,618,045 | A | 4/1997 | Kagan |
| 5,643,086 | A | 7/1997 | Alcorn |
| 5,655,961 | A | 8/1997 | Acres |
| 5,676,231 | A | 10/1997 | Legras |
| 5,702,304 | A | 12/1997 | Acres |
| 5,718,632 | A | 2/1998 | Hayashi |
| 5,741,183 | A | 4/1998 | Acres |
| 5,759,102 | A | 6/1998 | Pease |
| 5,761,647 | A | 6/1998 | Boushy |
| 5,768,382 | A | 6/1998 | Schneier |
| 5,769,716 | A | 6/1998 | Saffari |
| 5,770,533 | A | 6/1998 | Franchi |
| 5,779,545 | A | 7/1998 | Berg |
| 5,788,573 | A | 8/1998 | Baerlocher |
| 5,795,228 | A | 8/1998 | Trumbull |
| 5,796,389 | A | 8/1998 | Bertram |
| 5,797,085 | A | 8/1998 | Beuk |
| 5,809,482 | A | 9/1998 | Strisower |
| 5,811,772 | A | 9/1998 | Lucero |
| 5,816,918 | A | 10/1998 | Kelly |
| 5,818,019 | A | 10/1998 | Irwin, Jr. |
| 5,833,536 | A | 11/1998 | Davids |
| 5,833,540 | A | 11/1998 | Miodunski |
| 5,836,819 | A | 11/1998 | Ugawa |
| 5,851,148 | A | 12/1998 | Brune |
| 5,871,398 | A | 2/1999 | Schneier |
| D406,612 | S | 3/1999 | Johnson |
| 5,885,158 | A | 3/1999 | Torango |
| 5,919,091 | A | 7/1999 | Bell |
| 5,951,397 | A | 9/1999 | Dickinson |
| 5,952,640 | A | 9/1999 | Lucero |
| 5,954,583 | A | 9/1999 | Green |
| 5,957,776 | A | 9/1999 | Hoehne |
| 5,959,277 | A | 9/1999 | Lucero |
| 5,967,896 | A | 10/1999 | Jorasch |
| 5,971,271 | A | 10/1999 | Wynn |
| 5,984,779 | A | 11/1999 | Bridgeman |
| 5,999,808 | A | 12/1999 | LaDue |
| 6,001,016 | A | 12/1999 | Walker |
| 6,003,013 | A | 12/1999 | Boushy |
| 6,003,651 | A | 12/1999 | Waller |
| 6,010,404 | A | 1/2000 | Walker |
| 6,012,832 | A | 1/2000 | Saunders |
| 6,012,983 | A | 1/2000 | Walker |
| 6,019,283 | A | 2/2000 | Lucero |
| 6,038,666 | A | 3/2000 | Hsu |
| 6,048,269 | A | 4/2000 | Burns |
| 6,050,895 | A | 4/2000 | Luciano, Jr. |
| 6,062,981 | A | 5/2000 | Luciano |
| 6,068,552 | A | 5/2000 | Walker |
| 6,077,163 | A | 6/2000 | Walker |
| 6,089,975 | A | 7/2000 | Dunn |
| 6,099,408 | A | 8/2000 | Schneier |
| 6,104,815 | A | 8/2000 | Alcorn |
| 6,106,396 | A | 8/2000 | Alcorn |
| 6,110,041 | A | 8/2000 | Walker |
| 6,113,492 | A | 9/2000 | Walker |
| 6,113,493 | A | 9/2000 | Walker |
| 6,113,495 | A | 9/2000 | Walker |
| 6,135,884 | A | 10/2000 | Hedrick |
| 6,135,887 | A | 10/2000 | Pease |
| 6,139,431 | A | 10/2000 | Walker |
| 6,141,711 | A | 10/2000 | Shah |
| 6,142,369 | A | 11/2000 | Jonstromer |
| 6,149,522 | A | 11/2000 | Alcorn |
| 6,161,059 | A | 12/2000 | Tedesco |
| 6,162,121 | A | 12/2000 | Morro |
| 6,162,122 | A | 12/2000 | Acres |
| 6,174,234 | B1 | 1/2001 | Seibert, Jr. |
| 6,182,221 | B1 | 1/2001 | Hsu |
| 6,183,362 | B1 | 2/2001 | Boushy |
| 6,190,256 | B1 | 2/2001 | Walker |
| 6,206,283 | B1 | 3/2001 | Bansal |
| 6,210,279 | B1 | 4/2001 | Dickinson |
| 6,223,166 | B1 | 4/2001 | Kay |
| 6,227,972 | B1 | 5/2001 | Walker |
| 6,244,958 | B1 | 6/2001 | Acres |
| 6,247,643 | B1 | 6/2001 | Lucero |
| 6,253,119 | B1 | 6/2001 | Dabrowski |
| 6,264,560 | B1 | 7/2001 | Goldberg |
| 6,264,561 | B1 | 7/2001 | Saffari |
| 6,267,671 | B1 | 7/2001 | Hogan |
| 6,270,410 | B1 | 8/2001 | DeMar |
| 6,280,328 | B1 | 8/2001 | Holch |
| 6,285,868 | B1 | 9/2001 | LaDue |
| 6,293,866 | B1 | 9/2001 | Walker |
| 6,302,790 | B1 | 10/2001 | Brossard |
| 6,307,956 | B1 | 10/2001 | Black |
| 6,319,125 | B1 | 11/2001 | Acres |
| 6,341,353 | B1 | 1/2002 | Herman |
| 6,368,216 | B1 | 4/2002 | Hedrick |
| 6,371,852 | B1 | 4/2002 | Acres |
| 6,378,073 | B1 | 4/2002 | Davis |
| 6,379,246 | B1 | 4/2002 | Dabrowski |
| 6,383,076 | B1 | 5/2002 | Tiedeken |
| 6,409,595 | B1 | 6/2002 | Uihlein |
| 6,409,602 | B1 | 6/2002 | Wiltshire |
| 6,443,843 | B1 | 9/2002 | Walker |
| 6,450,885 | B2 | 9/2002 | Schneier |

(56) References Cited

U.S. PATENT DOCUMENTS

| | | | |
|---|---|---|---|
| 6,488,585 | B1 | 12/2002 | Wells |
| 6,496,928 | B1 | 12/2002 | Deo |
| 6,530,835 | B1 | 3/2003 | Walker |
| 6,561,903 | B2 | 5/2003 | Walker |
| 6,581,161 | B1 | 6/2003 | Byford |
| 6,582,310 | B1 | 6/2003 | Walker |
| 6,585,598 | B2 | 7/2003 | Nguyen |
| 6,628,939 | B2 | 9/2003 | Paulsen |
| 6,634,550 | B1 | 10/2003 | Walker et al. |
| 6,648,761 | B1 | 11/2003 | Izawa et al. |
| 6,676,522 | B2 | 1/2004 | Rowe et al. |
| 6,682,421 | B1 | 1/2004 | Rowe |
| 6,685,567 | B2 | 2/2004 | Cockerille |
| 6,702,670 | B2 | 3/2004 | Jasper |
| 6,739,975 | B2 | 5/2004 | Nguyen |
| 6,758,393 | B1 | 7/2004 | Luciano |
| 6,800,029 | B2 | 10/2004 | Rowe |
| 6,846,238 | B2 | 1/2005 | Wells |
| 6,869,362 | B2 | 3/2005 | Walker |
| 6,880,079 | B2 | 4/2005 | Kefford |
| 6,896,618 | B2 | 5/2005 | Benoy |
| 6,905,411 | B2 | 6/2005 | Nguyen |
| 6,924,903 | B2 | 8/2005 | Brooks et al. |
| 6,969,319 | B2 | 11/2005 | Rowe et al. |
| 7,004,388 | B2 | 2/2006 | Kohta |
| 7,004,837 | B1 | 2/2006 | Crowder, Jr. |
| 7,099,035 | B2 | 8/2006 | Brooks et al. |
| 7,153,210 | B2 | 12/2006 | Yamagishi |
| 7,167,724 | B2 | 1/2007 | Yamagishi |
| 7,275,991 | B2 | 10/2007 | Burns |
| 7,331,520 | B2 | 2/2008 | Silva |
| 7,335,106 | B2 | 2/2008 | Johnson |
| 7,337,330 | B2 | 2/2008 | Gatto |
| 7,341,522 | B2 | 3/2008 | Yamagishi |
| 7,416,485 | B2 | 8/2008 | Walker et al. |
| 7,419,428 | B2 | 9/2008 | Rowe |
| 7,467,999 | B2 | 12/2008 | Walker et al. |
| 7,477,889 | B2 | 1/2009 | Kim |
| 7,510,474 | B2 | 3/2009 | Carter, Sr. |
| 7,545,522 | B1 | 6/2009 | Lou |
| 7,552,341 | B2 | 6/2009 | Chen |
| 7,594,855 | B2 | 9/2009 | Meyerhofer |
| 7,611,409 | B2 | 11/2009 | Muir et al. |
| 7,644,861 | B2 | 1/2010 | Alderucci |
| 7,668,987 | B2 | 2/2010 | Brooks et al. |
| 7,693,306 | B2 | 4/2010 | Huber |
| 7,699,703 | B2 | 4/2010 | Muir |
| 7,753,789 | B2 | 7/2010 | Walker et al. |
| 7,758,420 | B2 | 7/2010 | Saffari |
| 7,771,271 | B2 | 8/2010 | Walker et al. |
| 7,785,193 | B2 | 8/2010 | Paulsen |
| 7,846,017 | B2 | 12/2010 | Walker et al. |
| 7,850,522 | B2 | 12/2010 | Walker et al. |
| 7,883,417 | B2 | 2/2011 | Bruzzese |
| 7,950,996 | B2 | 5/2011 | Nguyen |
| 7,988,550 | B2 | 8/2011 | White |
| 7,997,972 | B2 | 8/2011 | Nguyen et al. |
| 8,016,666 | B2 | 9/2011 | Angell |
| 8,023,133 | B2 | 9/2011 | Kaneko |
| 8,038,527 | B2 | 10/2011 | Walker et al. |
| 8,057,303 | B2 | 11/2011 | Rasmussen |
| 8,079,904 | B2 | 12/2011 | Griswold |
| 8,088,014 | B2 | 1/2012 | Wells |
| 8,096,872 | B2 | 1/2012 | Walker et al. |
| 8,118,668 | B2 | 2/2012 | Gagner et al. |
| 8,144,356 | B2 | 3/2012 | Meyerhofer |
| 8,157,642 | B2 | 4/2012 | Paulsen |
| 8,192,276 | B2 | 6/2012 | Walker et al. |
| 8,219,129 | B2 | 7/2012 | Brown |
| 8,220,019 | B2 | 7/2012 | Stearns et al. |
| 8,282,465 | B2 | 10/2012 | Giobbi |
| 8,282,490 | B2 | 10/2012 | Arezina |
| 8,286,856 | B2 | 10/2012 | Meyerhofer |
| 8,393,955 | B2 | 3/2013 | Arezina et al. |
| 8,419,548 | B2 | 4/2013 | Gagner |

| | | | |
|---|---|---|---|
| 8,469,800 | B2 | 6/2013 | Lemay |
| 8,512,144 | B2 | 8/2013 | Johnson et al. |
| 8,550,903 | B2 | 10/2013 | Lyons |
| 8,597,108 | B2 | 12/2013 | Nguyen |
| 8,597,111 | B2 | 12/2013 | Lemay et al. |
| 8,602,875 | B2 | 12/2013 | Nguyen |
| 8,608,569 | B2 | 12/2013 | Carrico |
| 8,613,659 | B2 | 12/2013 | Nelson |
| 8,613,668 | B2 | 12/2013 | Nelson et al. |
| 8,622,836 | B2 | 1/2014 | Nelson et al. |
| 8,721,434 | B2 | 5/2014 | Nelson et al. |
| 8,734,236 | B2 | 5/2014 | Arezina et al. |
| 8,827,813 | B2 | 9/2014 | Lemay et al. |
| 8,827,814 | B2 | 9/2014 | Lemay et al. |
| 8,876,595 | B2 | 11/2014 | Nelson et al. |
| 8,932,140 | B2 | 1/2015 | Gagner et al. |
| 8,956,222 | B2 | 2/2015 | Lemay et al. |
| 9,011,236 | B2 | 4/2015 | Nelson et al. |
| 2001/0039204 | A1 | 11/2001 | Tanskanen |
| 2001/0044337 | A1 | 11/2001 | Rowe |
| 2002/0020603 | A1 | 2/2002 | Jones |
| 2002/0061778 | A1 | 5/2002 | Acres |
| 2002/0077182 | A1 | 6/2002 | Swanberg |
| 2002/0082070 | A1 | 6/2002 | Macke |
| 2002/0087641 | A1 | 7/2002 | Levosky |
| 2002/0090986 | A1 | 7/2002 | Cote |
| 2002/0094869 | A1 | 7/2002 | Harkham |
| 2002/0107066 | A1 | 8/2002 | Seelig |
| 2002/0111206 | A1 | 8/2002 | Van Baltz |
| 2002/0111209 | A1 | 8/2002 | Walker |
| 2002/0145035 | A1 | 10/2002 | Jones |
| 2002/0147047 | A1 | 10/2002 | Letovsky |
| 2002/0147049 | A1 | 10/2002 | Carter, Sr. |
| 2002/0163570 | A1 | 11/2002 | Phillips |
| 2002/0169623 | A1 | 11/2002 | Call |
| 2002/0183046 | A1 | 12/2002 | Joyce |
| 2002/0196342 | A1 | 12/2002 | Walker |
| 2003/0003988 | A1 | 1/2003 | Walker |
| 2003/0008707 | A1 | 1/2003 | Walker |
| 2003/0027632 | A1 | 2/2003 | Sines |
| 2003/0032485 | A1 | 2/2003 | Cockerille |
| 2003/0045354 | A1 | 3/2003 | Giobbi |
| 2003/0054868 | A1 | 3/2003 | Paulsen |
| 2003/0054881 | A1 | 3/2003 | Hedrick |
| 2003/0064805 | A1 | 4/2003 | Wells |
| 2003/0074259 | A1 | 4/2003 | Slyman, Jr. |
| 2003/0083126 | A1 | 5/2003 | Paulsen |
| 2003/0083943 | A1 | 5/2003 | Adams |
| 2003/0092477 | A1 | 5/2003 | Luciano, Jr. |
| 2003/0104865 | A1 | 6/2003 | Itkis |
| 2003/0141359 | A1 | 7/2003 | Dymovsky |
| 2003/0144052 | A1 | 7/2003 | Walker |
| 2003/0148812 | A1 | 8/2003 | Paulsen |
| 2003/0162591 | A1 | 8/2003 | Nguyen |
| 2003/0172037 | A1 | 9/2003 | Jung |
| 2003/0186739 | A1 | 10/2003 | Paulsen |
| 2003/0199321 | A1 | 10/2003 | Williams |
| 2003/0203756 | A1 | 10/2003 | Jackson |
| 2003/0224852 | A1 | 12/2003 | Walker |
| 2003/0228900 | A1 | 12/2003 | Yamagishi |
| 2004/0014514 | A1 | 1/2004 | Yacenda |
| 2004/0016797 | A1 | 1/2004 | Jones |
| 2004/0023721 | A1 | 2/2004 | Giobbi |
| 2004/0039635 | A1 | 2/2004 | Linde |
| 2004/0043814 | A1 | 3/2004 | Angell |
| 2004/0085293 | A1 | 5/2004 | Soper |
| 2004/0106454 | A1 | 6/2004 | Walker |
| 2004/0127277 | A1 | 7/2004 | Walker |
| 2004/0129773 | A1 | 7/2004 | Lute, Jr. |
| 2004/0147314 | A1 | 7/2004 | LeMay |
| 2004/0185935 | A1 | 9/2004 | Yamagishi |
| 2004/0190042 | A1 | 9/2004 | Ferlitsch |
| 2004/0192434 | A1 | 9/2004 | Walker |
| 2004/0199284 | A1 | 10/2004 | Hara |
| 2004/0209690 | A1 | 10/2004 | Bruzzese |
| 2004/0225565 | A1 | 11/2004 | Selman |
| 2004/0259640 | A1 | 12/2004 | Gentles |
| 2004/0266395 | A1 | 12/2004 | Pailles |
| 2005/0014554 | A1 | 1/2005 | Walker |

(56) References Cited

U.S. PATENT DOCUMENTS

2005/0020354 A1 1/2005 Nguyen
2005/0049049 A1 3/2005 Griswold
2005/0054438 A1 3/2005 Rothschild
2005/0059485 A1 3/2005 Paulsen
2005/0070257 A1 3/2005 Saarinen
2005/0076242 A1 4/2005 Breuer
2005/0101383 A1 5/2005 Wells
2005/0130728 A1 6/2005 Nguyen
2005/0227770 A1 10/2005 Papulov
2005/0240484 A1 10/2005 Yan
2005/0255911 A1 11/2005 Nguyen
2005/0287852 A1 12/2005 Sugawara
2006/0018450 A1 1/2006 Sandberg-Diment
2006/0025206 A1 2/2006 Walker
2006/0025222 A1 2/2006 Sekine
2006/0035707 A1 2/2006 Nguyen
2006/0040741 A1 2/2006 Griswold
2006/0046823 A1 3/2006 Kaminkow
2006/0046834 A1 3/2006 Sekine
2006/0046842 A1 3/2006 Mattice
2006/0046855 A1 3/2006 Nguyen
2006/0049624 A1 3/2006 Brosnan et al.
2006/0079333 A1 4/2006 Morrow
2006/0089174 A1 4/2006 Twerdahl
2006/0160621 A1 7/2006 Rowe
2006/0165060 A1 7/2006 Dua
2006/0166732 A1 7/2006 Lechner
2006/0166741 A1 7/2006 Boyd
2006/0173781 A1 8/2006 Donner
2006/0189382 A1 8/2006 Muir
2006/0223627 A1 10/2006 Nozaki
2006/0226598 A1 10/2006 Walker
2006/0246981 A1 11/2006 Walker
2006/0247037 A1 11/2006 Park
2006/0266598 A1 11/2006 Baumgartner
2006/0271433 A1 11/2006 Hughes
2006/0279781 A1 12/2006 Kaneko
2006/0281554 A1 12/2006 Gatto
2006/0287072 A1 12/2006 Walker
2006/0287098 A1 12/2006 Morrow
2007/0017979 A1 1/2007 Wu
2007/0021198 A1 1/2007 Muir
2007/0060302 A1 3/2007 Fabbri
2007/0060372 A1 3/2007 Yamagishi
2007/0117608 A1 5/2007 Roper
2007/0117623 A1 5/2007 Nelson
2007/0129150 A1 6/2007 Crowder
2007/0129151 A1 6/2007 Crowder
2007/0155469 A1 7/2007 Johnson
2007/0159301 A1 7/2007 Hirt
2007/0174809 A1 7/2007 Brown
2007/0190494 A1 8/2007 Rosenberg
2007/0202941 A1 8/2007 Miltenberger et al.
2007/0218971 A1 9/2007 Berube
2007/0218985 A1 9/2007 Okada
2007/0218991 A1 9/2007 Okada
2007/0238505 A1 10/2007 Okada
2008/0026816 A1 1/2008 Sammon
2008/0026823 A1 1/2008 Wolf
2008/0026844 A1 1/2008 Wells
2008/0070671 A1 3/2008 Okada
2008/0076528 A1 3/2008 Nguyen
2008/0076572 A1 3/2008 Nguyen et al.
2008/0085753 A1 4/2008 Okada
2008/0123026 A1 5/2008 Kwag
2008/0139306 A1 6/2008 Lutnick
2008/0166997 A1 7/2008 Sun
2008/0182644 A1 7/2008 Lutnick
2008/0200251 A1 8/2008 Alderucci
2008/0207296 A1 8/2008 Lutnick
2008/0213026 A1 9/2008 Grabiec
2008/0234028 A1 9/2008 Meyer
2008/0261682 A1 10/2008 Phillips
2008/0268934 A1 10/2008 Mattice
2008/0270302 A1 10/2008 Beenau
2008/0293483 A1 11/2008 Pickus
2008/0300061 A1 12/2008 Zheng
2008/0305860 A1 12/2008 Linner
2008/0305862 A1 12/2008 Walker
2008/0305873 A1 12/2008 Zheng
2008/0311971 A1 12/2008 Dean
2008/0318655 A1 12/2008 Davies
2009/0011821 A1 1/2009 Griswold
2009/0023490 A1 1/2009 Moshal
2009/0054149 A1 2/2009 Brosnan
2009/0098943 A1 4/2009 Weber et al.
2009/0124350 A1 5/2009 Iddings
2009/0125429 A1 5/2009 Takayama
2009/0131134 A1 5/2009 Baerlocher
2009/0186680 A1 7/2009 Napolitano et al.
2009/0197684 A1 8/2009 Arezina
2009/0227317 A1 9/2009 Spangler
2009/0233715 A1 9/2009 Ergen
2009/0275397 A1 11/2009 Van Baltz
2010/0012715 A1 1/2010 Williams
2010/0016075 A1 1/2010 Thomas
2010/0048297 A1 2/2010 Dasgupta
2010/0062840 A1 3/2010 Herrmann
2010/0069160 A1 3/2010 Barrett
2010/0087241 A1 4/2010 Nguyen
2010/0087249 A1 4/2010 Rowe
2010/0093421 A1 4/2010 Nyman
2010/0093429 A1 4/2010 Mattice
2010/0113061 A1 5/2010 Holcman
2010/0113161 A1 5/2010 Walker
2010/0173691 A1 7/2010 Wolfe
2010/0174650 A1 7/2010 Nonaka
2010/0178986 A1 7/2010 Davis
2010/0219234 A1 9/2010 Forbes
2010/0227670 A1 9/2010 Arezina
2010/0234099 A1 9/2010 Rasmussen
2010/0250787 A1 9/2010 Miyata
2010/0304848 A1 12/2010 Detlefsen
2010/0323785 A1 12/2010 Motyl
2010/0323789 A1 12/2010 Gabriele et al.
2010/0331079 A1 12/2010 Bytnar
2011/0015976 A1 1/2011 Lempel
2011/0028199 A1 2/2011 Luciano, Jr.
2011/0065496 A1 3/2011 Gagner
2011/0065497 A1 3/2011 Patterson, Jr.
2011/0076963 A1 3/2011 Hatano
2011/0086691 A1 4/2011 Luciano, Jr.
2011/0086696 A1 4/2011 MacEwan
2011/0098104 A1 4/2011 Meyerhofer
2011/0118008 A1 5/2011 Taylor
2011/0119098 A1 5/2011 Miller et al.
2011/0136576 A1 6/2011 Kammler et al.
2011/0195789 A1* 8/2011 Wells .................. G07F 17/3202
463/47
2011/0207531 A1 8/2011 Gagner
2011/0208418 A1 8/2011 Looney
2011/0242565 A1 10/2011 Armstrong
2011/0263318 A1* 10/2011 Agarwal ............... G07F 17/323
463/25
2011/0287823 A1 11/2011 Guinn
2011/0295668 A1 12/2011 Charania
2011/0306400 A1 12/2011 Nguyen
2011/0306401 A1 12/2011 Nguyen
2011/0314153 A1 12/2011 Bathiche
2012/0015735 A1 1/2012 Abouchar
2012/0046110 A1 2/2012 Amaitis
2012/0066048 A1 3/2012 Foust
2012/0084131 A1 4/2012 Bergel
2012/0100908 A1 4/2012 Wells
2012/0122584 A1* 5/2012 Nguyen .............. G07F 17/3209
463/25
2012/0122585 A1 5/2012 Nguyen
2012/0129611 A1 5/2012 Rasmussen
2012/0149561 A1 6/2012 Ribi
2012/0187187 A1 7/2012 Duff
2012/0221474 A1 8/2012 Eicher
2012/0252556 A1 10/2012 Doyle

(56) References Cited

U.S. PATENT DOCUMENTS

| | | | |
|---|---|---|---|
| 2012/0290336 | A1 | 11/2012 | Rosenblatt |
| 2013/0013389 | A1 | 1/2013 | Vitti |
| 2013/0017884 | A1 | 1/2013 | Price |
| 2013/0023339 | A1 | 1/2013 | Davis |
| 2013/0053133 | A1 | 2/2013 | Schueller |
| 2013/0053136 | A1 | 2/2013 | Lemay |
| 2013/0053148 | A1 | 2/2013 | Nelson et al. |
| 2013/0065668 | A1 | 3/2013 | Lemay et al. |
| 2013/0065678 | A1 | 3/2013 | Nelson et al. |
| 2013/0065686 | A1 | 3/2013 | Lemay et al. |
| 2013/0130777 | A1 | 5/2013 | Lemay et al. |
| 2013/0137509 | A1 | 5/2013 | Weber et al. |
| 2013/0137510 | A1 | 5/2013 | Weber et al. |
| 2013/0137516 | A1 | 5/2013 | Griswold et al. |
| 2013/0252713 | A1 | 9/2013 | Nelson et al. |
| 2013/0324237 | A1 | 12/2013 | Adiraju et al. |
| 2014/0045586 | A1 | 2/2014 | Allen et al. |
| 2014/0221099 | A1 | 8/2014 | Johnson et al. |

OTHER PUBLICATIONS

U.S. Appl. No. 13/157,166, filed Jun. 9, 2011.
U.S. Appl. No. 13/217,105, filed Aug. 24, 2011.
U.S. Appl. No. 13/217,110, filed Aug. 24, 2011.
U.S. Appl. No. 13/220,430, filed Aug. 29, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/335,613, filed Dec. 22, 2011.
U.S. Appl. No. 13/426,479, filed Mar. 21, 2011.

* cited by examiner

Detect E-cash-out button activation 402

Activate interface, change interface status and initiate countdown timer 404

Request virtual ticket voucher information from remote server 406

Generate virtual ticket voucher 408

Transmit virtual ticket voucher information and receive information from portable electronic device 410

Send information received from portable electronic device to remote server 412

Determine countdown timer has expired without detecting device 414

Generate printed ticket voucher and output via printer 416

Update soft and/or hard meters according to type of voucher output 418

Enter operator mode 420

Display information involving previously issued virtual ticket vouchers including device information 422

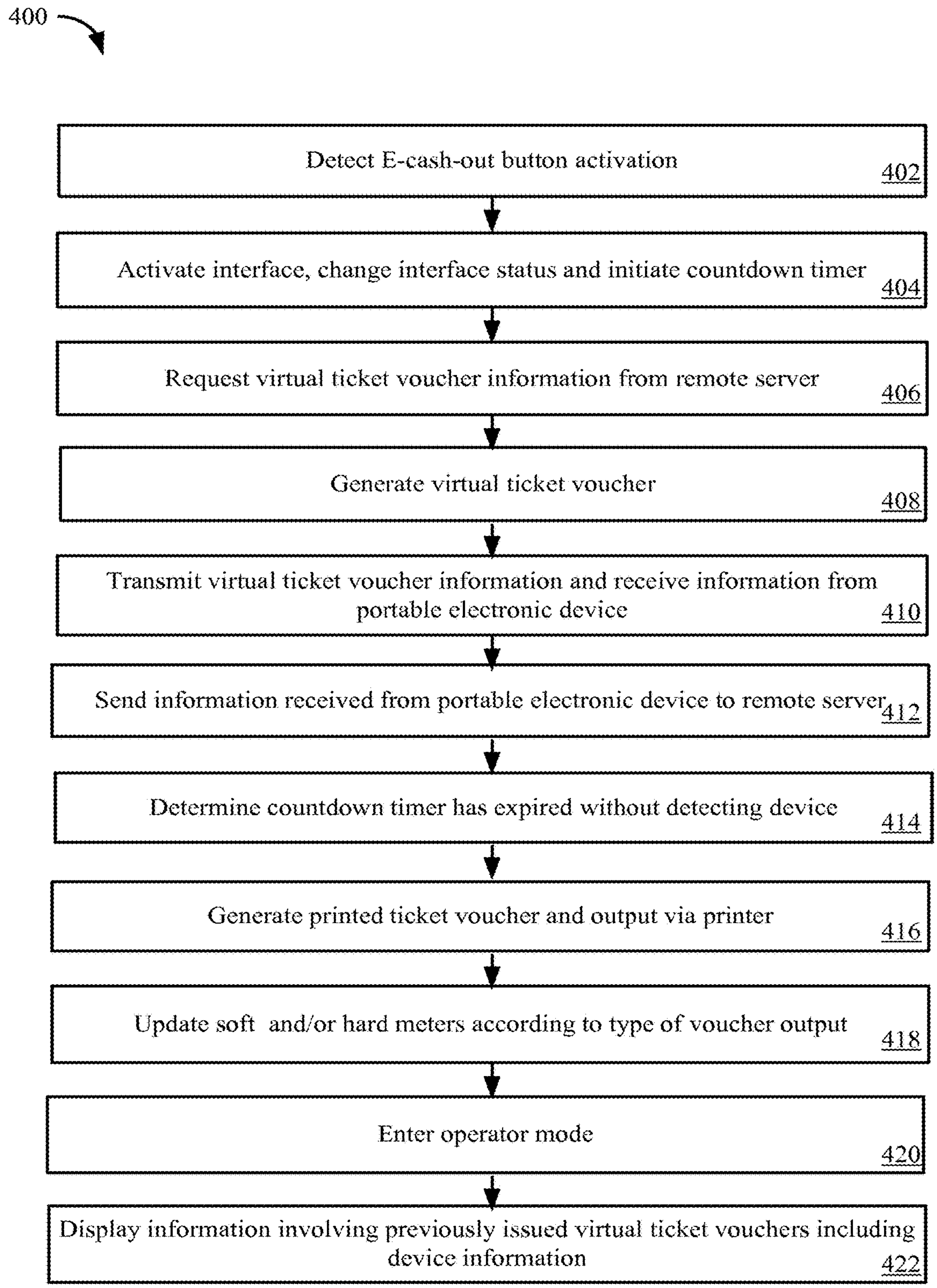

*Fig. 5B*

RETROFIT DEVICES FOR PROVIDING VIRTUAL TICKET-IN AND TICKET-OUT ON A GAMING MACHINE

PRIORITY CLAIM

This application is a continuation of, claims the benefit of and priority to U.S. patent application Ser. No. 18/597,383, filed on Mar. 6, 2024, which is a continuation of, claims the benefit of and priority to U.S. patent application Ser. No. 18/595,928, filed on Mar. 5, 2024, which is a continuation of, claims the benefit of and priority to U.S. patent application Ser. No. 18/595,018, filed on Mar. 4, 2024, which is a continuation of, claims the benefit of and priority to U.S. patent application Ser. No. 18/529,488, filed on Dec. 5, 2023, which is a continuation of, claims the benefit of and priority to U.S. patent application Ser. No. 18/370,278, filed on Sep. 19, 2023, which is a continuation of, claims the benefit of and priority to U.S. patent application Ser. No. 17/590,547, filed on Feb. 1, 2022, which is a continuation of, claims the benefit of and priority to U.S. patent application Ser. No. 16/933,712, filed on Jul. 20, 2020, which is a continuation of, claims the benefit of and priority to U.S. patent application Ser. No. 15/178,351, filed on Jun. 9, 2016, which is a continuation of, claims the benefit of and priority to U.S. patent application Ser. No. 13/229,507, filed on Sep. 9, 2011, the entire contents of which are each incorporated by reference herein.

BACKGROUND

1. Field of the Described Embodiments

The described embodiments relate generally to gaming systems, such as gaming systems deployed in a casino enterprise. More particularly, apparatus and method for moving value on and off of an electronic gaming machine are described.

2. Description of the Related Art

An electronic gaming machine (EGM) that is configured to provide a wager-based game can be likened to a combination of an automatic teller machine and a home gaming console. The automatic teller machine aspect relates to the cash handling capabilities of the EGM which allow it to securely receive, store and dispense cash or an indicia of credit redeemable for cash. The home gaming console aspect relates to the game generation capabilities of the EGM, which allow it to generate and display games that are entertaining to a user of the EGM.

To provide cash handling capabilities, a common configuration for an EGM, such as a video slot machine or mechanical slot machine, is to include a bill validator and a ticket printer. The bill validator is configured to accept and validate cash currency and ticket vouchers where the ticket vouchers are bearer instruments redeemable for cash or game play on an EGM. Accepted cash or ticket vouchers can be converted to credits that are used to make wagers on the EGM. The accepted tickets are stored within a cash box secured within a locked EGM cabinet. When a player wishes to leave and has credits remaining on the EGM, the credits are converted to a cash value and are output as a ticket voucher via the printer where the cash value is typically printed on the ticket. The printed ticket voucher can be used to add credits to another EGM or the printed ticket voucher can be redeemed for its cash value.

Significant labor costs result from using a bill validator and a ticket printer on an EGM. The labor costs involve periodically removing a cash box including received tickets and cash from the EGM and replacing it with an empty one, counting the cash and tickets removed from the EGM and refilling the ticket stacks on the EGM. Other cash handling configurations also involve similar labor costs. For instance, EGMs can include coin acceptors and coin dispensers. The use of these devices requires periodically removing coins or adding coins to the EGM. Then, the coins retrieved from each EGM are counted on an EGM by EGM basis.

For security purposes, a technician and one or more security providers are typically involved in operations where cash is removed from an EGM. The security providers make sure the cash is retrieved and transported without theft. Further, since removing cash requires the EGM cabinet to be opened, the security providers observe the operation to make sure that tampering doesn't occur with the EGM hardware. An individual might wish to tamper with an EGM to get it to award jackpots, receive cash or dispense cash in an unintended manner The removed cash is transported to a secure area where additional individuals are involved in counting and recording the various sums of cash and/or ticket vouchers removed from each EGM. The cash amounts removed from each EGM are reconciled with other information sources, such as from hard meters on the EGM or records from a server that generates and validates ticket vouchers. The reconciliation process is important for ensuring the earnings from the EGM are properly taxed.

Gaming enterprises operating electronic gaming machines are always looking for ways of reducing labor costs. In view of the above, new methods of cash handling are desired that reduce the labor costs associated with operating EGMs.

SUMMARY OF THE DESCRIBED EMBODIMENTS

A gaming system compatible with patron-controlled portable electronic devices, such as smart phones and tablet computers, is described. The gaming system can include gaming devices, such as electronic gaming machines and system servers. The portable electronic devices can be configured to store and transmit virtual ticket voucher information to an EGM or a redemption kiosk and receive a virtual ticket voucher issued from the EGM. The EGM can include one or more wireless interfaces and can be configured to communicate using one more different wireless communication protocols. The wireless interface communication interfaces and wireless communication protocol capabilities can enable communications with the portable electronic devices. In a particular embodiment, the EGM can include a wireless interface compatible with a near-field wireless communication protocol.

In a particular embodiment, an EGM can be configured to redeem and issue both virtual ticket vouchers and printed ticket vouchers. The virtual ticket vouchers can be redeemed on other EGMs for credits used to place wagers on a game of chance generated or can be redeemed at a redemption kiosk for cash. The virtual ticket vouchers can be stored on a patron-controlled portable electronic device. In one embodiment, the virtual ticket vouchers can be compatible with existing cashless voucher handling systems that provide for the issuance and redemption of printed ticket vouchers. Thus, the cashless voucher handling system can be configured to provide for the validation, redemption and issuance of both printed ticket vouchers and virtual ticket vouchers.

On aspect of the embodiments described herein is related to a method in a gaming device including a processor and a memory interposed on a communication link between a game controller and a printer. The method can be generally characterized as including: 1) comprising: receiving a command from the game controller for the printer to issue a printed ticket voucher; 2) prior to receiving the command from the game controller, receiving an indication to issue virtual ticket voucher wherein the indication is not received from the game controller and performing the following steps, a) blocking the command from reaching the printer; b) parsing the command for a ticket validation number and a ticket amount; c) generating a virtual ticket voucher including the ticket validation number and the ticket amount; d) sending the virtual ticket voucher to a portable electronic device; and c) emulating the printer to respond to the game controller as if the printed ticket voucher is being generated including sending false messages to the game controller; 3) when the indication is not received prior to receiving the command from the game controller, allowing communications between the printer and the game controller, including the command from the game controller to the printer issue the printed ticket voucher and related communications to pass through the gaming device (i.e., the processor determines whether to block or allow each of the communications between the printer and the game controller). When the virtual ticket voucher is issued, the messages to the game controller from the gaming device can be considered as false messages because an actual printed ticket voucher is not generated. Nevertheless, the gaming device responds to the game controller like a printed voucher is being generated.

In particular embodiments, the method can include performing one or more of the following steps: a) initiating a countdown timer; b) determining the countdown time is expired and the virtual ticket voucher is not sent to the portable electronic device; c) sending the command to the printer to issue the printed ticket voucher; and d) allowing communications between the printer and the game controller to pass through the gaming device.

Another aspect of the embodiments described herein is related to a method in a gaming device including a processor and a memory, interposed on a communication link between a game controller and a bill validator, and separate from the bill validator. The method can be generally characterized as comprising: 1) receiving an indication to redeem a virtual ticket voucher; 2) receiving a virtual ticket voucher from a portable electronic device; 3) communicatively emulating the bill validator to allow the game controller to process the virtual ticket voucher as if a printed ticket voucher has been accepted by the bill validator including a) sending a ticket validation number associated to the virtual ticket voucher to the game controller, b) receiving a message from the game controller for the bill validator indicating the printed ticket voucher is not valid; c) blocking the message from the game controller from reaching the bill validator; d) sending a false message to the game controller indicating the printed ticket voucher has been ejected; 4) receiving a message from the bill validator to the game controller that a bill or printed ticket voucher has been accepted and 5) allowing the message from bill validator and subsequent communications between the bill validator and the game controller related to the message to pass through the gaming device (i.e., the processor determines whether to block or allow each of the communications between the bill validator and the game controller). When the virtual ticket voucher is not valid, the message to the game controller from the gaming device indicating the printed ticket voucher has been ejected can be considered a false message because an actual printed ticket voucher is not being generated. Nevertheless, the gaming device responds to the game controller like a printed voucher is being ejected.

BRIEF DESCRIPTION OF THE DRAWINGS

The embodiments will be readily understood by the following detailed description in conjunction with the accompanying drawings, wherein like reference numerals designate like structural elements, and in which:

FIG. 5B is a method in a gaming machine for issuing virtual ticket vouchers on a gaming machine.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with portable electronic devices controlled by users of the gaming system is described. In one embodiment, the portable electronic devices can be configured to store and transmit virtual ticket voucher information to an EGM or a redemption kiosk and receive virtual ticket voucher information associated with a virtual ticket voucher issued from the EGM. The virtual ticket vouchers can be redeemed on the EGM for credits used to place wagers on a game of chance or can be redeemed for cash at a redemption kiosk. The EGM can be configured to issue virtual ticket vouchers to transfer credits from the EGM. In one embodiment, the virtual ticket vouchers can be made compatible with existing cashless handling systems that provide for the issuance and redemption of printed ticket vouchers with little modification to the existing cashless handling system. Thus, the cashless system can be configured to provide for the validation, redemption and issuance of both printed ticket vouchers and virtual ticket vouchers.

With respect to the following figures, methods and apparatus that allow a cashless system to include virtual ticket vouchers is described. In particular, with respect to FIG. 1 and interactions between a portable electronic device and an EGM with a game controller configured to provide virtual ticket-in and ticket-out services are described. With respect to FIGS. 3A and 3B, an EGM retrofitted with one or more devices that provide virtual ticket-in and/or virtual ticket-out services is described. With respect to FIG. 4A interactions between a portable electronic device and a remote server that provides virtual ticket voucher issuance and redemption capabilities is described. A voucher management application for managing virtual ticket vouchers on a portable electronic device is described with respect to FIGS. 4B and 4C. Methods of issuing and redeeming virtual ticket vouchers in an EGM are described with respect to FIGS. 5A and 5B. Finally, details of gaming devices and gaming systems compatible with virtual ticket-in and virtual ticket-out services are described.

External Interface and EGM-Portable Device Interactions

Figure 1:
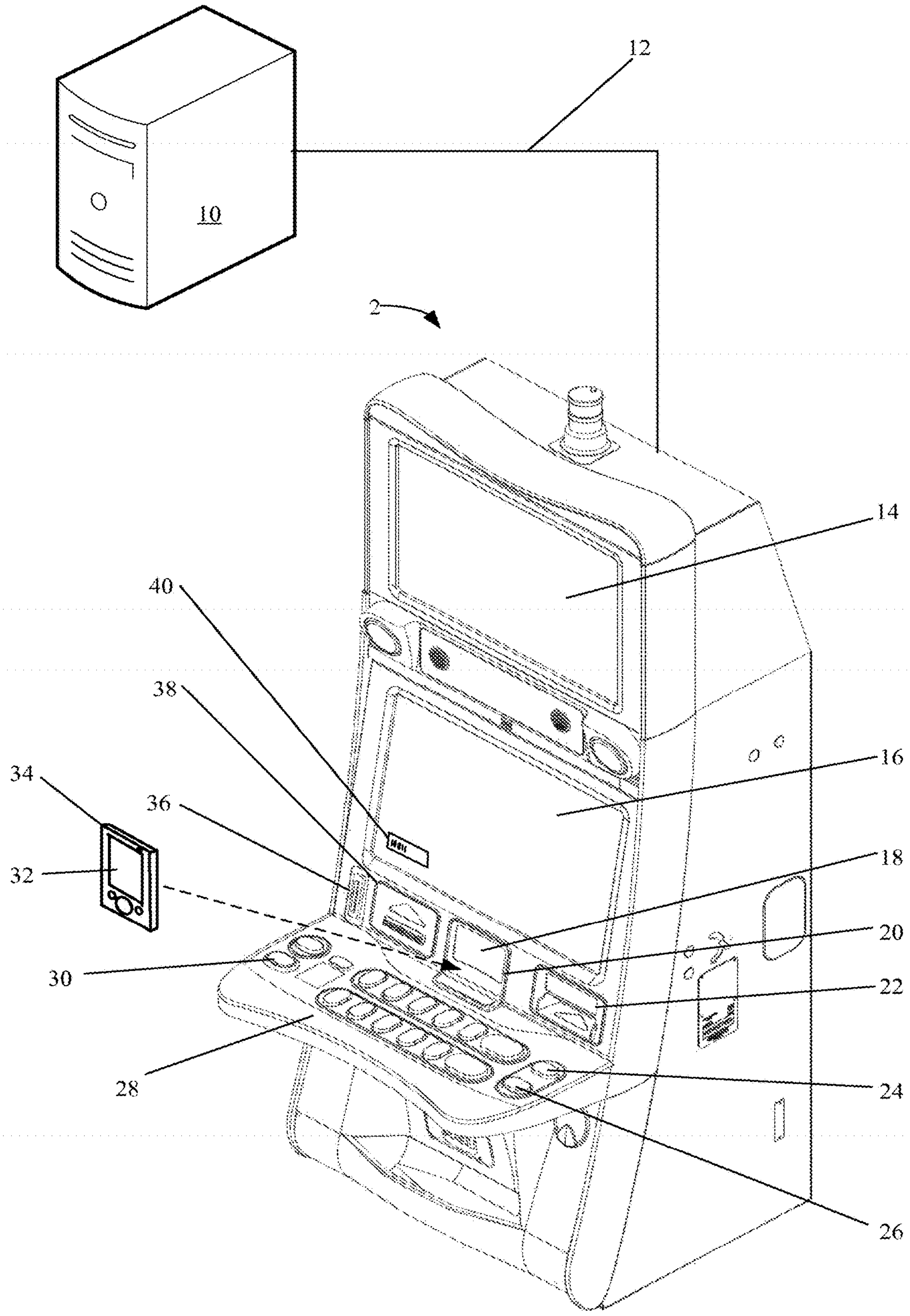
FIG. 1 is a perspective drawing of a gaming system including virtual ticket-in and ticket-out services in accordance with the described embodiments.

FIG. 1 is a perspective drawing of a gaming system including virtual ticket-in and ticket-out services in accordance with the described embodiments. For the purposes of illustration, a gaming system server 10 is shown connected to an electronic gaming machine (EGM) 2. In other embodiments, the EGM 2 can be connected to multiple servers and the gaming system server 10 can be connected to multiple EGMs. EGM 2 is configured to communicate with a portable electronic device 34. Further, one or more gaming system servers, such as 10, can be configured to communicate with portable electronic devices, such as 34.

On the EGM, the communication with the portable electronic device can occur through a wireless or a wired interface. In various embodiments, for the purposes of communicating with a portable electronic device, the EGM 2 can configured with a single wireless interface but no wired interfaces, multiple wireless interfaces but no wired interfaces, a single wired interface but no wireless interfaces, multiple wired interfaces but no wireless interfaces or a combination of wireless and wired interfaces. Thus, the communication interfaces described with respect to FIG. 1 are for the purposes of illustration and are not meant to be limiting.

In a particular embodiment, one or more of the wired or wireless interfaces can be dedicated to operator functions and may only recognize particular devices carried by an operator. For instance, a wireless interface can be dedicated to allowing an operator perform maintenance functions, such as receiving diagnostic information from the EGM. In another example, a wireless interface can be dedicated towards performing operator functions, such as placing the EGM in a dispute resolution mode, a hand-pay mode or a W-2 (tax requirement) mode. Again, the EGM can be configured to recognize particular operator registered devices via this interface. In yet another example, a wireless interface can dedicated only to premium customers. Via the dedicated wireless interface and their portable electronic device, a premium customer may be able to access to certain functions on the EGM that are not available to other customers.

As will be discussed in more detail below, one or more of the wireless or wired interface can be used for transactions involving cash handling on the EGM 2. An interface can be dedicated for this purpose. For instance, a dedicated cash handling interface can be configured only to receive information associated with cash handling. In other embodiments, a wired or wireless interface on the EGM can be used for cash handling transactions with the portable electronic device as well as more general communications, such as transferring information that can be used in a loyalty program or a social media application.

As follows, the EGM 2 is briefly described and then cash handling interactions involving a portable electronic device 34, the EGM 2 and gaming system server 10 are discussed. Additional details of the EGM are described with respect to FIGS. 6 and 7. The EGM 2 can include multiple displays, such as displays 14 and 16. The displays can be used to output video images associated with a wager-based game play, such as a presentation associated with a main game or a bonus game. Game play decisions can be entered via a player input panel 28. In addition, displays 14 and/or 16 can be provided with a touch screen interface and an associated touch screen controller. The touch screen interfaces can be used to enter information about decisions associated with game play as well as information associated with other functions offered on a gaming machine.

The EGM 2 can include a number of devices used in cash handling transactions. The cash handling devices can include 1) a bill acceptor 22 configured to accept cash and/or ticket vouchers, a printer 38 configured to generate printed ticket vouchers and 3) a card reader 36 which can be configured to read a magnetic striped card or a smart card. The magnetic striped card or the smart card can be used to transfer funds, such as funds stored on a debit card. Further, the card reader 36 can be used to read account information associated with a loyalty program account.

In a particular embodiment, a wireless interface 18 can be configured to receive information, such as information associated with a virtual ticket voucher, from a portable electronic device 34. As an example, the wireless interface 18 can be configured to implement a near field communication (NFC) protocol. The NFC protocol is designed with a communication range of 4 cm or less. NFC operates at 13.56 MHz on ISO/IEC 18000-3 air interface and at rates ranging from 106 kbit/s to 848 kbit/s. NFC can involve an initiator and a target. The initiator actively generates an RF field that can power a passive target. This enables NFC targets to take very simple form factors such as tags, stickers, key fobs, or cards that do not require batteries. NFC peer-to-peer communication is of course possible, where both devices are powered. For instance, the electronic device 34 and EGM 2 can be configured to implement a peer-to-peer communication.

Wireless interface 18 can be also used to accept information from a digital wallet application, such an E-wallet application. E-wallets can store passwords, credit card numbers, email contacts and identification data like driver's license or social security numbers. In some instances, an E-wallet can be linked to a bank account. In the embodiments described herein, an E-wallet application can be used to transfer "cash" electronically to an EGM that can be used for wagers. When funds are received electronically, such as via an E-wallet transaction, the EGM 2 can be configured to store an electronic record of the transaction in a manner similar to cash transactions involving physical currency.

Figure 6:
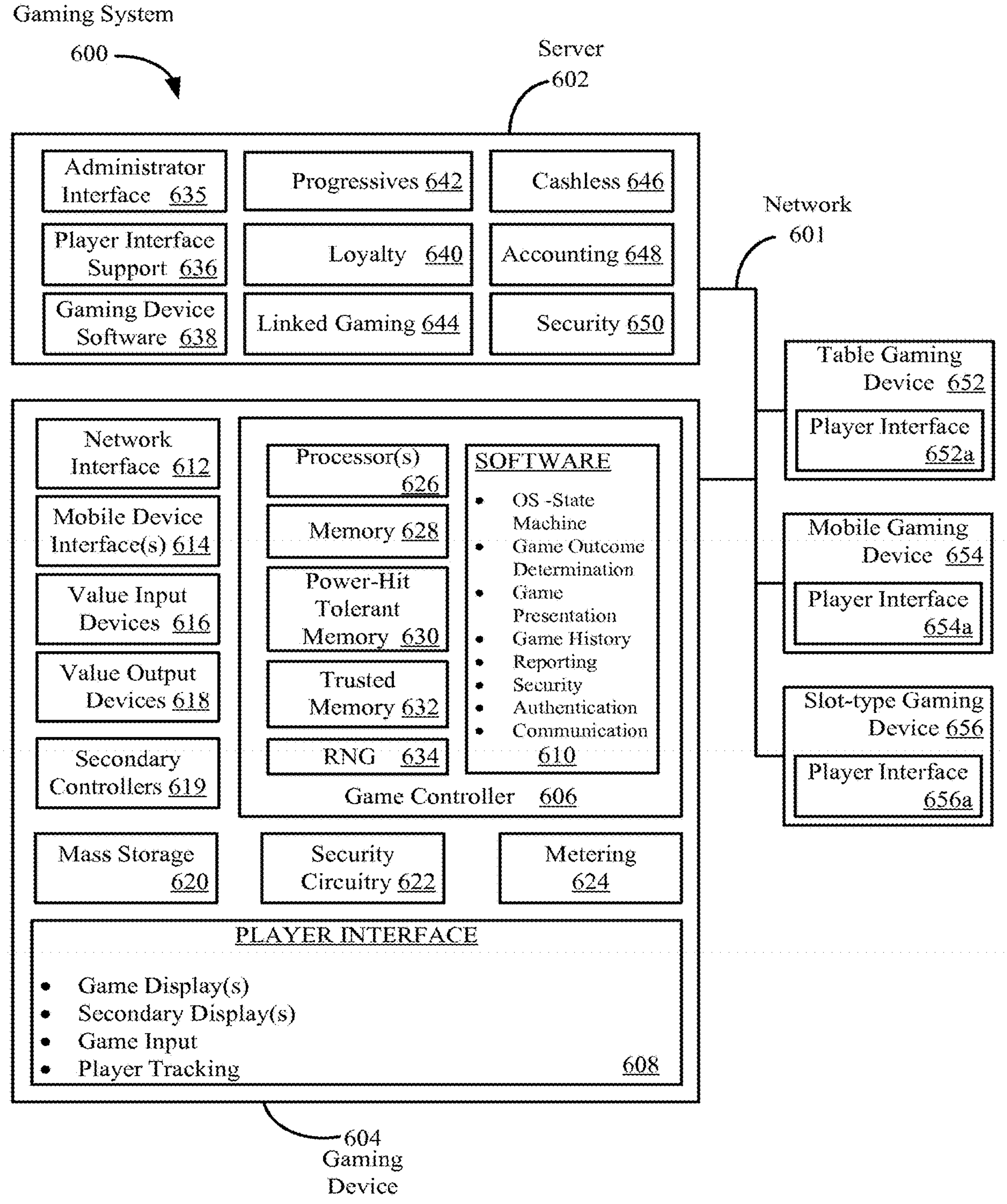
FIG. 6 shows a block diagram of a gaming device in accordance with the described embodiments.
Figure 7:
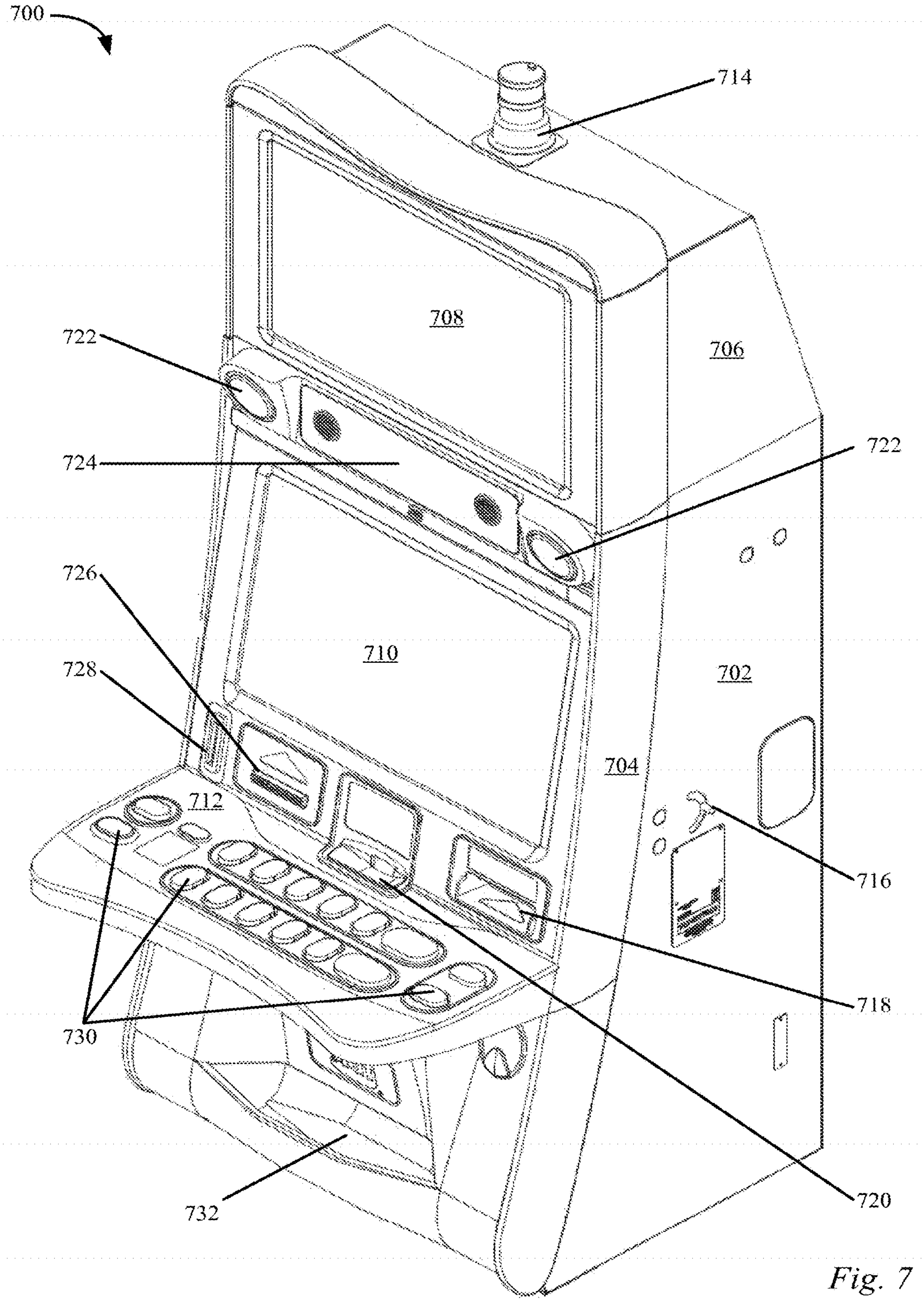
FIG. 7 shows a perspective drawing of a gaming device in accordance with the described embodiments.

As is discussed in more detail with respect to FIGS. 6 and 7, other wireless interface protocols can also be implemented on EGM 2. For instance, the EGM 2 can be configured to provide Wi-Fi and/or Bluetooth™ communications. These protocols can be used in lieu of or in combination with NFC. For instance, an NFC communication can be used to instantiate a Wi-Fi or Bluetooth™ communication between the EGM 2 and portable electronic device 34, such as secure pairing using one of these protocols. Further details of device pairing are described below with respect to FIG. 2.

In particular embodiments, the portable electronic device 34 can be configured with an application that manages virtual ticket vouchers that are redeemable for game play. On the gaming system side, the virtual ticket vouchers can be generated in a manner similar to printed ticket vouchers. With printed ticket voucher, a gaming system server, such as 10, can be configured to generate and store a validation number associated with a particular amount of cash or credits. The validation number and the amount associated with the validation number can be stored in a ticket voucher database. The validation number and the amount associated with the validation are stored so that when the ticket voucher is later presented for redemption it can be validated. The validation can be performed by the gaming system server or another device in the gaming system.

Next, the gaming system server can send information that allows the validation number to be located in the ticket voucher database to the EGM 2. Via the printer 38, the information that allows the ticket voucher to be located in the ticket voucher database and the amount associated with the ticket voucher can be printed on a blank ticket voucher and then output. The information can be printed in different formats, such as in a text format and/or in a symbol format, such as a bar-code. Later, to redeem the ticket, information stored on the printed ticket voucher can be read and parsed at an EGM, a redemption kiosk or a cashier station. The information read from the ticket can be compared to information stored in server 10 when the ticket voucher was created. If the server determines information matches and the ticket voucher hasn't be previously redeemed, then the ticket voucher can be redeemed for cash or additional game play.

Similar to a printed ticket voucher, to generate a virtual ticket voucher, the EGM 2 can send a request to server 10 to generate a unique identification number for a cash amount to be transferred off of the EGM 2. Alternatively, the EGM 2 or some other device can generate the unique identification number that is sent to sever 2. The gaming system server can store the identification number and the cash amount associated with the ticket as well as the unique information associated with the EGM 2. The unique EGM information can be later used for reconciliation purposes. Then, the unique identification number can be sent to the EGM 2.

As described above, the virtual ticket vouchers and printed ticket vouchers can be generated in the same manner and with little modification to an existing cashless system. However, there are some possible differences as described as follows. One difference can be that the server 10 is configured to record whether the ticket voucher is issued as a printed ticket or a virtual ticket. Printed ticket vouchers can include an identification number, such as xx-xxxxXX-XX. The identification number can be modified to indicate whether it is associated with a virtual ticket voucher or a printed ticket voucher. For instance, 01-xxxxxx-xx can be used for printed ticket vouchers while 02-xxxxxx-xx can be used for virtual ticket vouchers.

A determination of whether the ticket voucher is generated as a virtual ticket voucher or printed ticket voucher can occur on the EGM 2. A default position of the EGM 2 can be to generate a printed ticket voucher if a requested virtual ticket voucher is not successfully generated. For instance, as is described in more detail below, can request a virtual ticket voucher accidently, cancel it and request a printed ticket voucher. Thus, an indication of whether the requested virtual ticket voucher is issued as virtual ticket or a printed ticket voucher can be received at the server in an acknowledgement the EGM 2 and the server can change the format in which the ticket voucher has been issued if it has changed.

Denoting whether the ticket voucher is a printed or a virtual ticket voucher can be important for record keeping purposes. In the case of a redeemed printed ticket voucher, it is expected that there will be a corresponding piece of paper when the ticket is redeemed. For virtual printed tickets, there may not be such a record. For instance, when a printed ticket is redeemed at an EGM, it is expected that when the cash box is subsequently removed from the EGM, the cash box includes the printed ticket. The presence or non-presence of the printed ticket can be identified in a soft count when the cash in the cash box is counted.

A soft count is one process for counting banknotes in a casino or bank. The soft count rooms are usually among the most secure places due to the large amounts of cash that can be on hand at any one time. The counting is usually done by accounting professionals called soft counters, using computer spreadsheets. Typically, a soft count room contains a large table upon which the currency to be counted is placed, known as the "count table". Count room personnel manually organize the currency so that it can be easily counted by hand or by a counting machine. Most modern count rooms are equipped with high-speed computerized machines that perform the counting process.

In a particular embodiment, the cash box on the EGM 2 can be equipped with a memory. Virtual ticket voucher information can be loaded to the memory as virtual ticket voucher information tickets are redeemed at the EGM 2. The bill acceptor or the EGM 2 can be configured to transfer this information to the memory. The memory may also include a record of the printed ticket vouchers received into the cash box. Further, it can include a combined transaction list including cash transactions, printed ticketed transaction and virtual ticket transactions in the order in which they were generated. When the cash box is removed and the bills and printed ticket vouchers are counted, the memory on the cash box can be interrogated for virtual ticket voucher information and other transaction information, if it is stored, as part of the soft count process. Thus, the cash box can have a complete record of cash and ticket vouchers accepted at the EGM 2 where a portion of the ticket vouchers can be printed ticket vouchers and a portion of the ticket vouchers can be virtual ticket vouchers stored electronically.

If desired, equivalent printed vouchers can be generated from the virtual ticket voucher information to be used as part of the soft count process from the information stored in the cash box. For instance, the cash box can be connected to a printer where sheets including one or of the virtual ticket vouchers can be generated. For example, 4 ticket vouchers per sheet or 8 ticket vouchers per sheet can be generated. The virtual ticket vouchers can be output in a format similar to a printed ticket voucher, such as including a bar-code and other information normally included on a printed ticket. The printed sheets including virtual ticket information can be stored for some time period for auditing purposes.

In one embodiment, the virtual ticket voucher can be created in response to receiving an input from the E-cash out button 26. After the E-cash out button activation is detected, if credits remain on the EGM 2, the EGM 2 can be configured to send the request for the unique validation number and cash amount for the voucher to server 10 via connection 12. In response, the EGM 2 can receive the unique validation number from the server 10. Based upon the information received from the server, the EGM can generate a virtual ticket voucher.

In one embodiment, an image of the virtual ticket voucher can be generated and output to a display on the EGM 2, such as 14 and 16. As an example, an image of a virtual ticket voucher 40 is shown. The front of the virtual ticket voucher can be displayed or the front and back of the virtual ticket voucher can be displayed. In one embodiment, a virtual ticket voucher that is displayed can be formatted in the same manner as a printed ticket voucher, such that it looks like a printed ticket voucher. For instance, the front of the printed ticket voucher might include a bar-code, a cash value, a location where it was issued, a unique identification number. The back of the ticket can include a disclaimer such as, "This ticket is a bearer instrument. The operator is not responsible for lost or stolen tickets. The player is responsible for checking this ticket for accuracy, including the date and amounts shown, and must immediately notify an attendant of any error. Tickets are void if illegible, altered, counterfeit, incomplete, produced in error, or fail any validation testing. Neither the operator nor IGT™ shall be responsible for the issuance, validation or payment of lost, stolen, counterfeit or multiple EZ Pay cash vouchers. IGT™ and the operator shall be discharged from any and all liability upon payment of any claim arising from the redemption of the first cash voucher presented with a valid bar code. IGT™ and the operator reserve the right to withhold validation and payment pending a determination whether the cash voucher has been stolen or lost"

To prevent someone from taking a picture of the displayed image and converting it to a virtual ticket voucher and trying to redeem, a portion of information needed to redeem the virtual ticket voucher may not be displayed. For instance, a second unique validation number can be transmitted from the EGM 2 to the portable electronic device 34 that is needed to redeem the ticket. This second unique validation number may not be rendered in the image of the virtual ticket voucher displayed on the EGM 2. Besides, ticket information, such as a second unique validation number, data can be sent to the portable electronic device that allows an image of virtual ticket voucher rendered on EGM 2 to also be rendered on the user's portable electronic device.

The format of the images of the virtual ticket voucher can vary from gaming enterprise to gaming enterprise and can further vary from location to location within the gaming enterprise. Further, the format of the virtual ticket images can vary from EGM 2 to EGM 2 within a location if the print capabilities in each EGM are different such that it affects the format of the printed ticket voucher that is output. In other embodiments, the generated virtual ticket voucher image displayed on EGM 2 can be different from printed ticket vouchers. For instance, the system can be configured to allow a user to select a custom format for their virtual ticket vouchers. The EGM 2 can be configured to generate and display a custom formatted virtual ticket voucher to the display.

In one embodiment, the custom format virtual ticket voucher information can be stored on their portable electronic device 34 and transmitted to the EGM 2, such as via a wireless or wired communication connect between device 34 and EGM 2. As another example, the custom format virtual ticket voucher information can be stored in a loyalty program account on a gaming system server. This information can be retrieved when the user provides loyalty program account information to the EGM 2. In another embodiment, the images of the virtual ticket vouchers that are displayed on the EGM 2 can be a standard format, such as to match the format of the printed ticket vouchers issued at the EGM 2. The virtual ticket voucher information can be transmitted to the user's portable electronic device. Then, via an application running on the user's portable electronic device 34, the user can select a custom format to display the virtual ticket voucher. In yet other embodiments, the images of the virtual ticket voucher can be selected to match a theme of the game or reflect a theme associated with a calendar event, such as a holiday them.

In alternate embodiments, an image of the virtual ticket voucher doesn't have to be displayed. For instance, a message might be output to display 16 of "please retrieve your virtual ticket voucher for X dollars" but an image of the virtual ticket voucher may not be generated. In another example, a bezel 20 around interface 18 may light-up in a particular color and/or flash with a particular light pattern to indicate the virtual ticket voucher is ready. In other embodiments, a combination of a message, an image of the virtual ticket voucher and/or a lighted bezel can be used. For instance, a formatted virtual ticket voucher can be output can be output to display 16 with a message and the bezel 20 can change state to indicate that the virtual ticket voucher is ready.

When the virtual ticket voucher is ready, the EGM 2 can indicate it is ready to transfer the virtual voucher, such as via changing bezel state 20. In response, when a NFC protocol is used, the portable electronic device 34 can be brought in proximity to even in contact with the outer surface of interface 18. In one embodiment, for security purposes, a virtual ticket voucher application executed on the portable electronic 34 may have to be active for a transaction to take place, i.e., for the portable electronic device 34 to receive virtual ticket voucher information from the EGM 2. Similarly, as is described in more detail below, the virtual ticket voucher may have to be active on the portable electronic device 34 to transmit virtual ticket voucher information stored on the portable electronic device 34 to the EGM 2.

If another wireless protocol with a longer range is utilized or a wired connection is utilized, it may not be necessary for the portable electronic device to be placed in close proximity to interface 18. In response to receiving virtual ticket voucher information from the EGM 2, information about the virtual ticket voucher can be output on the display 32 of the portable electronic device 32. The information that is output to display 32 can be selected to match the format of information output to display 16 on the EGM 2. For instance, if a virtual ticket voucher image is output to display 16, then the virtual voucher image can also appear on the user's device after the transfer of information. With virtual ticket voucher information simultaneously output on both displays, the user can compare the images on the display 32 and the EGM 2 to visually confirm the successful transfer.

When the virtual ticket voucher is ready and the interface 18 and optionally the bezel 20 have been activated, the EGM 2 may begin a countdown timer. If a successful transfer is not made to a portable electronic device, such as 34, within the time period associated with the countdown timer, the EGM 2 can convert the virtual ticket voucher transaction to a printed ticket voucher transaction and generate a printed ticket that is output via the printer 38. If the type of voucher (virtual or printed) is indicated by the identification number on the ticket, then the EGM 2 can be configured to alter the identification number that is printed on the printed ticket voucher so that it now reflects a number that is consistent with a printed ticket voucher. In addition, the EGM 2 can contact the server 10 to notify in the change in format and number for the voucher and the server 10 can store this information. In one embodiment, a cancel button can be provided on the EGM 2 that switches a cash out transaction from a virtual ticket voucher to a printed ticket voucher.

A virtual ticket voucher transaction may time out or a user may wish to cancel a virtual ticket voucher for a number a reasons. For instance, the user may cancel because they realize they have forgotten or lost their phone. In another example, the user may have requested a virtual ticket transaction accidently, such as by hitting the E-cash out button instead of the cash out button. In another example, their portable electronic device 34 may have run out of charge or may not be functioning properly. In yet another example, the interface 18 may not be functioning properly, the user's portable electronic device may not be functioning properly or a combination of problems with the interface 18 or the user's portable electronic device may prevent the transaction from occurring.

After the virtual ticket voucher is transferred to the user's portable electronic device, an application executing on the portable electronic device can be executed that allows the user to manage their virtual ticket vouchers. For instance, as mentioned above, the application may allow the user to customize the appearance of the virtual ticket voucher in the application. In another example, the application can be configured to keep track of when printed ticket vouchers have been received and an expiration date of the ticket. The application can be configured to notify the user if a virtual ticket voucher is nearing its expiration date. In yet another example, the application can be configured to exchange information with an E-wallet application or can include E-wallet functionality. In a further example, virtual ticket voucher information can be stored in the "cloud," i.e. remote distributed storage, and the application can be configured to access and retrieve virtual ticket voucher information stored in the "cloud." Further details of this application are described with respect to FIGS. 4B and 4C.

When information is transferred wirelessly between the EGM 2 and the portable electronic device, the EGM 2 can be configured to receive and store unique device identification information associated with portable electronic device. Further, the portable electronic device can be configured to receive and store information associated with the EGM 2. The EGM 2 can be configured to associate the unique device identification information with the virtual ticket voucher that was issued. The unique portable device identification information can be stored on the EGM 2 and also sent to a validation server, such as server 10, where it can also be associated with the virtual ticket voucher information that was generated.

In one embodiment, as a requirement or optionally if the user desires, the unique portable device identification information can be used in the redemption of the virtual ticket voucher. When the virtual ticket voucher is presented at a redemption device, such as EGM 2, the unique identification information associated with the portable electronic device and the unique identification information associated with the virtual ticket voucher can be received at the redemption device and transmitted to a validation device, such as server 10. Then, the validation device can compare the received virtual ticket voucher information and portable electronic device identification information to the virtual ticket voucher information and portable device information stored when the virtual ticket voucher was issued. If unique player identification information is known, such as information associated with a loyalty program, then this information can also be included in the validation process.

When the information matches, then the validation device can send a message to the redemption device to redeem the virtual ticket voucher at the amount associated with the virtual ticket voucher. If the portable electronic device information matches and the virtual ticket voucher has already been redeemed, then the validation device can send a message to the redemption device including this information. In response, the redemption device can display a message, such as ticket previously redeemed. If the portable device information doesn't match but the virtual ticket voucher information matches, the validation device can send a message to the redemption device regarding this state. In response, in one embodiment, the redemption device can display a message, such as "Virtual ticket voucher is invalid" or "Device information is invalid go to the cashier station to redeem the ticket." At the cashier station, the user may have to present identification information to redeem the virtual ticket voucher that is stored on the portable electronic device with unique device identification information that doesn't match the portable electronic device to which the ticket voucher was issued. If the virtual ticket voucher information doesn't match any of the records on the validation device, then the validation device can send a message indicating this state to the redemption device. In response, the redemption device can display a message, such as "ticket voucher invalid."

The portable electronic device information received that is gathered during an issuance of a virtual ticket voucher or the redemption of a virtual ticket voucher can be used in a dispute resolution process. A patron may decide that an amount of a virtual ticket voucher transmitted from the EGM 2 to the portable electronic device 34 is incorrect or an amount of a virtual ticket voucher transmitted from the portable electronic device 34 to the EGM 2 is incorrect. In response, the player may request the presence of an operator. The operator can place the EGM 2 in a dispute resolution mode where a record of virtual vouchers issued from the EGM 2 or accepted on the EGM 2 can be accessed.

The dispute resolution mode may allow information regarding virtual ticket vouchers issued or accepted at the EGM 2 to be retrieved from memory and displayed on the EGM 2. The operator may be able scroll the ticket voucher records in order of acceptance or issuance. In one embodiment, a player may be able to couple their portable electronic device 34 to the interface 18. In response, the EGM 2 can be configured to search the stored ticket voucher records and display information regarding any virtual ticket vouchers issued to the portable electronic device 34 or received from the portable electronic device 34. In one embodiment, the EGM 2 can be configured to reissue a virtual ticket voucher to the portable electronic device, such as if the player convinces the operator that the information regarding a virtual ticket voucher issued to the portable electronic device has been lost for some reason.

In other embodiments, virtual ticket voucher information can be accessed via a secondary device, such as a player tracking unit or via a "service window" on the EGM 2. For instance, an electronic log of virtual voucher activity and/or virtual cash activities can be stored on a remote host which can be accessible via a service window on the EGM 2. Further details of service windows applications are described below with respect to FIG. 6.

As described above, the redemption of virtual ticket voucher stored on a portable electronic device, such as 34, can involve transferring virtual ticket voucher information from the portable electronic device 34 to a redemption device, such as EGM 2. On EGM 2, the cash value associated with the virtual ticket voucher can be converted to credits where the credits can be used for wagers on a game of chance. In one embodiment, the virtual ticket voucher transfer from device 34 to EGM 2 can be initiated when the EGM 2 detects an actuation of the E-cash-in button 24.

In a particular embodiment, restricted credits can be transferred to the EGM 2 via a virtual ticket voucher. For instance, restricted credits can be transferred to the EGM 2 that are available for wagers but can't be redeemed for cash. In other embodiments, a virtual ticket voucher can be redeemed to unlock a feature on the EGM 2, such as a particular bonus mode. In yet other embodiments, a virtual ticket voucher can be used to transfer information associated with persistent gaming, such as progress or achievements a player has previously obtained playing a game. In other embodiments, a virtual ticket voucher can be used to 1) transfer tax information associated with an EGM pay out, such as a W2G receipt, 2) report metering information associated with the EGM 2 and 3) report diagnostic information associated with the EGM 2, such as when the EGM is not functioning properly.

In response to detecting the actuation of button 24, the EGM 2 can change the state of interface 18 so that it is enabled to receive an information transfer from a portable electronic device, such as 34. Further, the change in state of the interface 18 can be indicated by a change in state of a status indicator associated with interface 18. For instance, a bezel 20 surrounding the interface 18 can be lit up with a particular color and/or light pattern to indicate the interface 18 is ready to receive virtual ticket voucher information. Further, if enabled, a sound pattern can be emitted from the status indicator to indicate it is ready to receive virtual ticket voucher information from a portable electronic device.

In a particular embodiment, when interface 18 is activated a countdown time can be started. If the countdown timer reaches a termination value, such a zero, before a communication is established with a portable electronic device, then the interface 18 can be turned off and the status indicator associated with interface 18 can be changed to indicate it is not ready to receive information. For instance, the bezel 20 surrounding the interface can be lit up with a particular light patter and/or color to indicate a transition state. In addition, the status indicator can be configured to indicate the transition from an on state to and off state is about to occur. For instance, the bezel 20 can change to a particular color and flash at an increasing rate before the interface 18 is turned off. A particular sound pattern can also be emitted to indicate the transition.

In other embodiments, the interface 18 can be configured to support an active communication session between the portable electronic device and the interface 18. For instance, interface 18 can support NFC communications and Bluetooth™ communications. A user can tap a NFC and Bluetooth™ enabled device to the interface 18. The tap can transmit, via NFC, data which allows a Bluetooth™ communication pairing to be set up between the portable electronic device and the EGM 2. The communication pairing can utilize encrypted communications. The status indicator 19 can be used to indicate whether the communication pairing is active or not between the portable electronic device and the EGM 2.

In one embodiment, the application that allows the transfer of the virtual ticket voucher from the portable electronic device to the EGM 2 may have to be active on the portable electronic device 34 before a transfer can occur. Further, a secondary authentication method, such as entering a PIN correctly, may be required on the portable electronic device 34 before the transfer is allowed to occur. In one embodiment, the use of a secondary authentication method can be triggered based upon an amount of the ticket voucher that is to be redeemed such that vouchers above a certain amount require a secondary authentication while vouchers below a certain amount do not require a secondary authentication.

During the redemption process, an image of the virtual ticket voucher that is to be redeemed can be displayed on the display 32 of the portable electronic device 34. When the virtual ticket voucher information is successfully transmitted to EGM 2, it can be displayed on the EGM 2, such as in an image of a ticket voucher 40. Then, the user can compare the virtual ticket voucher information displayed on the display 32 to the virtual ticket voucher information displayed on display 16 or some other display on the EGM 2.

In one embodiment, an image data associated with a virtual ticket voucher and/or formatting information can be transmitted from the portable electronic device 34 to the EGM 2 so that the image rendered on the EGM 2 appears similar to the image rendered on portable electronic device 34. As an example, as described above, an application running on portable electronic device 34 can be configured to allow a user to customize the appearance of virtual ticket vouchers displayed on their device. Thus, some of the custom formatting information related to the virtual ticket voucher appearance can be transferred from the portable electronic device to the EGM.

In another embodiment, the image rendered of a virtual ticket voucher can be a standard format that is not affected by formatting information received from the portable electronic. As described above, the only front of the virtual ticket voucher or the front and back of the virtual ticket voucher can be rendered on a display on the EGM 2. In addition as described above, an image of the virtual ticket voucher doesn't have to be rendered on the EGM 2. For instance, when a virtual ticket voucher is accepted, the EGM 2 can be configured to display a message such as "virtual ticket voucher for x dollars received" where "x" is the amount associated with the ticket.

After the virtual ticket voucher is successfully received, the EGM 2 can send received virtual ticket information to a validation device, such as gaming system server 10. The validation device can determine whether the information associated with the virtual ticket voucher is associated with a valid virtual ticket voucher that hasn't already been redeemed. When the information is valid, the validation device can send a message to the redemption device, such as EGM 2, to redeem the virtual ticket voucher for an amount that the validation server determines is associated with the virtual ticket voucher.

The redemption device can receive the message from the validation device and in response, redeem the ticket in some manner For instance, in the case of the EGM 2, the ticket can be redeemed for credits. As another example, a redemption kiosk, in response to receiving a validation message can dispense the cash amount associated with the virtual ticket voucher. After redeeming the virtual ticket voucher, the redemption device can send a message to the validation device indicating it has successfully redeemed the virtual ticket voucher. In response, the validation device can store information indicating the virtual ticket voucher has been redeemed. Thus, if the person controlling the portable electronic device attempts to redeem the virtual ticket voucher again, the validation device can be configured to indicate the transaction is invalid because the virtual ticket voucher has been previously redeemed. The redemption device, such as EGM 2, can be configured to store information regarding the virtual ticket voucher that has been received and optionally unique device identification information from the portable electronic device that transmitted the virtual ticket voucher information to the redemption device. The redemption device can also be configured to send the portable electronic device information to a remote device, such as server 10.

There are a number of potential advantages of providing virtual ticket voucher functionality on an EGM. In the case of virtual ticket voucher issuance, one advantage is that the stack of blank tickets used to generate printed ticket vouchers may have to be refilled less frequently. This reduces the material costs associated with purchasing tickets and the labor costs associated with refilling the blank ticket stack because the rate at which printed tickets are generated is reduced. Further, it is better for the environment since less paper is used. In the case of virtual ticket voucher redemption, one advantage is that the cash box associated with the bill/ticket acceptor may fill up more slowly. Thus, the labor costs associated with removing and replacing a full cash box can be reduced since the cash box will fill up more slowly. Further, the soft count process can be simplified reducing labor costs because less printed tickets need to be handled during the soft count process.

Internal Device Control

Figure 2:
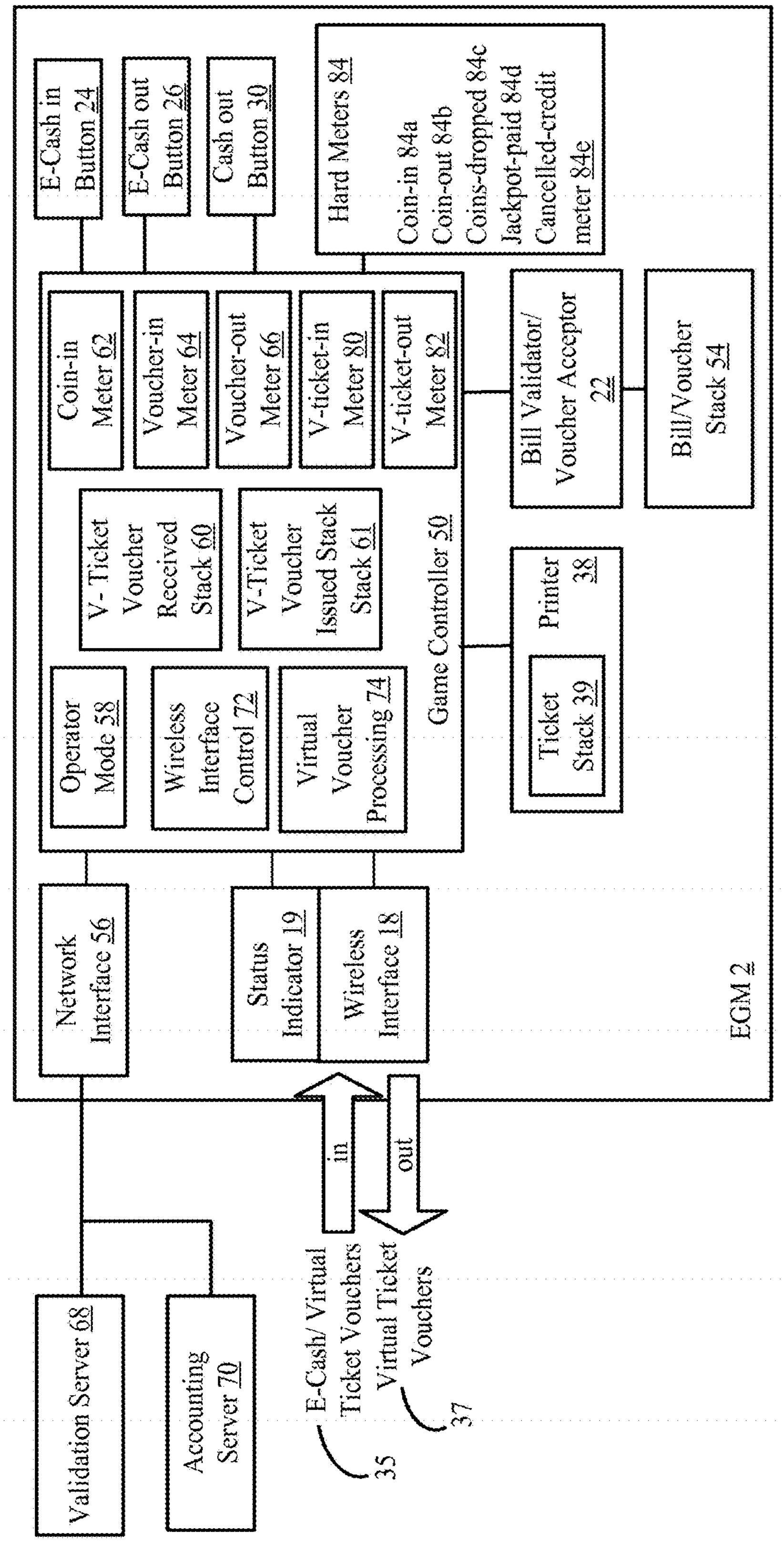
FIG. 2 is a block diagram of an electronic gaming machine configured for virtual ticket-in and ticket-out services in accordance with the described embodiments.

Next details of internal configurations of an EGM configured to redeem and/or issue virtual ticket vouchers are described. With respect to FIG. 2, an EGM with a game controller modified to redeem and/or issue virtual ticket vouchers is discussed. With respect to FIGS. 3A and 3B, EGMs are described where the game controller remains unmodified and where virtual ticket-in/ticket-out functions are performed by retrofit devices, such as a retrofit printer and/or a retrofit bill/ticket acceptor. FIG. 2 is a block diagram of an electronic gaming machine 2 configured for virtual ticket-in and ticket-out services.

The EGM 2 is coupled to a validation server 68 and an accounting server 70 via a network interface 56. The validation server 68 can be configured to 1) generate validation numbers for printed and virtual ticket vouchers issued at EGM 2 and 2) validate virtual ticket and printed ticket vouchers received at the EGM 2. The validation server 68 can be part of a cashless system. The accounting server 70 can be configured to receive accounting information, such as coin-in/coin-out, from the EGM 2. The accounting server 70 can be part of a loyalty program system where members can earn points redeemable for comps based upon their game play. In one embodiment, the network interface 56 can be a smart interface board (SMIB) associated with a player tracking system.

The virtual ticket voucher processing, involving such steps as validation, redemption and issuance of virtual ticket vouchers described above with respect to FIG. 1, can be handled by the virtual voucher processing logic 74 on the game controller 50. The control of the wireless interface 18, such as powering it on and off in response to certain events, establishing communication sessions with portable electronic devices and sending information via the wireless interface 18, can be handled by the wireless interface control 72. As described above, the EGM 2 can include multiple wireless interfaces and game controller 50 can be configured to communicate using multiple wireless communication protocols.

Virtual ticket voucher information can be transmitted and received via the wireless interface 18. In one embodiment, the wireless interface 18 can be integrated into the cabinet of the EGM 2 (e.g., see FIG. 1) and game controller 50 can be configured to communicate directly with and send control commands to the wireless interface 18. In other embodiments, the wireless interface 18 can be integrated into a device mounted to and/or within the gaming machine cabinet, such as the printer 38, the bill validator/voucher acceptor 22, a card reader (not shown) or a player tracking unit (not shown). For instance, a wireless interface 18 can be integrated into a bezel surrounding a printer slot, a card reader slot or a bill/ticket acceptor slot. In yet another example, the wireless interface can be integrated into a player tracking unit.

In the embodiments where the wireless interface is embedded in a secondary device, such as a printer or a player tracking unit, the game controller 50 can optionally communicate via the wireless interface and send control commands to control the wireless interface via a secondary controller, such as printer controller or a player tracking controller. For instance, the game controller 50 can detect an actuation of the E-cash out button 26 and then send a command to the secondary device including the wireless interface to turn on the wireless interface. In the secondary device, a secondary device controller can simple forward the command to the wireless interface 18, which can be configured to respond to the command from the game controller 50. In another example, the secondary device controller can be configured to interpret the command received by the game controller 50 where the command received by the game controller can be at a high level and not understood by the wireless interface 18. From the high-level command received from the game controller 50, the secondary device controller can generate a low-level command understood by the wireless interface 18 that is incorporated in the secondary device.

In other embodiments, a secondary device can include virtual ticket voucher processing logic executed by a secondary controller. For instance, the printer 38 can include a printer controller capable of executing virtual ticket voucher processing logic and printed ticket logic and a wireless interface (Other examples of secondary devices with this capability can include but are not limited to a player tracking unit, a card reader or a bill validator). The game controller 50 can be configured to detect an actuation of the E-cash out button 26. In response, the game controller 50 can send a high-level message to the printer 38, such as "generate a virtual ticket voucher of a particular amount." In response to receiving the command from the game controller 50, the printer controller can generate low-level commands to control various devices on the printer that allow the high-level command to be implemented. For instance, the printer controller can generate commands that 1) turn-on the wireless interface on the printer and change a status of a status indicator for the wireless interface on the printer to indicate it is "on," 2) receive device information from a portable electronic device and then construct and send a message that allows a virtual ticket voucher to be sent to the portable electronic device and 3) send an acknowledgement to the game controller when the virtual ticket voucher has been received. The acknowledgement can include unique identifier information associated with the portable electronic device that received the virtual ticket voucher.

The game controller 50 can be configured to logically recognize a secondary device with multiple functions as separate devices according to the functions. The game controller 50 can recognize the devices during a device enumeration process. For example, a card reader with card reader functions and a capability to accept virtual ticket vouchers can present itself to the game controller 50 as a card reader 50 and a bill validator that accept virtual ticket vouchers. In this example, the game controller 50 may have already enumerated a first bill validator that accepts only cash and printed tickets. Thus, after the enumeration process, the game controller can logically be configured to control a card reader, a first bill validator that accepts cash and printed tickets and a second bill validator that accepts virtual ticket vouchers.

In yet other embodiments, the virtual ticketing voucher processing logic executed on a secondary device can be transparent to the game control controller 50. For example, the game controller 50 may be simply configured to send a "print ticket voucher" command and the secondary controller can be configured to issue the ticket voucher as a virtual ticket voucher. For instance, a card reader with this capability can receive the "print ticket voucher" command and issue a virtual ticket voucher. The card reader can be configured to communicate with a remote host to receive ticket validation numbers to associate with the virtual ticket voucher and report the issuance of the virtual ticket voucher to the remote host. If the card reader is not able to issue the virtual ticket voucher and a printer is present, the card reader can forward the command to the printer to have it issue a printed ticket voucher.

If the game controller 50 doesn't receive an acknowledgement within some time period, the game controller 50 can send a command to the printer to cancel the virtual ticket voucher transaction and generate a printed voucher for the amount. In response, the printer controller can turn-off the wireless interface and change the status indicator for the wireless interface to indicate it is no longer on. Then, the printer controller can control various print devices used to issue a printed ticket voucher.

Returning to FIG. 2, in various embodiments, the wireless interface 18 can include a wireless interface controller (not shown) separate from the game controller 50 for processing signals received at the wireless interface and for controlling signals emitted by the interface. The wireless interface controller can be configured to communicate directly with the game controller 50 or can communicate with a secondary controller that acts as an intermediary between the game controller 50 and the wireless controller. Via the interface 18, information 34 regarding electronic cash transfers and virtual can be received and information 35 regarding virtual ticket vouchers. The received signals, such as signals associated with a virtual ticket voucher, can be parsed for information according to a particular wireless communication protocol, such as an NFC protocol. The parsing of information from received wireless signal data can be done within the wireless interface and then sent to the game controller 50 or the signal data can be sent the game controller 50 or a secondary controller and parsed within the game controller 50 or secondary controller (not shown).

The interface 18 can be configured to send information formatted in one or more different wireless communication protocols. For instance, as described above, the EGM 2 via the wireless interface 18 can be configured to communicate information formatted in a NFC compatible protocol. Although not shown, a wired connection can be used to receive virtual ticket voucher information as well as other types of information from a wired interface coupled to a portable electronic device. The communication protocol used for the wired communication connection can vary depending on the wired connection that is utilized. In one embodiment, it can be USB. In a particular embodiment, the physical connection can be a micro USB compatible connection.

In other embodiments embodiment, an NFC interface on an EGM 2 can be used to set-up a higher speed communication between the EGM 2 and another NFC enabled device such as smart phone. The higher speed communications can occur via wireless interface 18 or another wireless interface on the EGM 2. The higher speed communication rates can be used for expanded content sharing. For instance, a NFC and Bluetooth enabled EGM can be tapped by an NFC and Bluetooth enabled smart phone to instantiate Bluetooth pairing between the devices. Instantiating pairing between a gaming device and an NFC enabled device, such as a smartphone, in this manner can save time related to searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

As described above, the NFC communication can be used to exchange information to allow pairing to be established between a user-controlled device and the EGM 2. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the EGM 2 and a portable electronic device, a portable electronic device may be able to utilize some of the functionality of secondary devices residing on the EGM 2. For instance, it may be possible for a player to print something from their portable electronic device using the printer 38 on the EGM 2 when it is paired to the EGM 2.

The game controller 50 can be used to control a status of the wireless interface 18, such as an "on" status where it is operable to receive wirelessly transmitted information from a portable electronic device or an "off" status where it is not operable to receive information. In particular embodiments, the game controller 50 can be configured to turn on the wireless interface in response to detecting an actuation of an E-cash in button 24 or an E-cash out button 26 (The actuation of the buttons can generate a signal which is received by the controller 50). In various embodiments, the E-cash in button or the E-cash out button can be integrated into a player input panel on the EGM cabinet. Further, the E-cash in button 24 and/or the E-cash out button 26 can be integrated into a secondary device, such as on the printer 38, the bill validator/voucher acceptor 22, a card reader (not shown) or a player tracking unit (not shown).

The status of the wireless interface 18 and upcoming changes in status to the wireless interface 18 can be indicated by an interface status device 19. The interface status device 19 can include components, such as lights and/or audio devices. The game controller 50 can be configured to control the interface status device 19 in a way that indicates the state of the wireless interface 18, such as on, off and about to change from on to off. As noted above, the control can be direct or via an intermediary device, such as a secondary controller.

Metering

For accounting and regulatory purposes, the game controller 50 can be configured to update and maintain a variety of hard and soft meters on the EGM. The hard and soft meters can be affected by transactions involving virtual ticket vouchers. A hard meter can be an electro-mechanical device, like an odometer, with a display that advances to display a quantity. Usually, a hard meter is not resettable. Government regulations, which can vary from jurisdiction to jurisdiction, often require hard meters to be read on a regular basis, such as monthly. Examples of hard meters 84 can include coins-in 84*a*, coins-out 84*b*, coins-dropped 84*c*, jackpots-paid 84*d* and cancelled credit meter 84*e*. Other hard meters can be implemented and these are provided for the purposes of illustration only.

The game controller 50 can be configured to update the coins-in meter 84*a* in response to value-in transactions. For example, the coins-in meter 84*a* can accumulate all value-in transaction on the EGM 2, such as from coin, bills, credit, token, paper token, printed ticket vouchers and virtual ticket voucher transactions. Thus, when a virtual ticket voucher is accepted on the EGM 2, the coins-in meter 84*a* can be updated by some amount depending on the value of the virtual ticket voucher. Devices, such as but not limited to the wireless interface 18, the bill validator/voucher acceptor 22 and a coin acceptor (not shown) can be used in performing a value-in transaction. In addition, via the network interface 56, the game controller 50 can be configured to receive a transfer of value, such as credits, to the EGM 2, from a remote device such as a bonusing server.

The game controller 50 can be configured to update the coins-out meter 84*b* in response to value-out transactions for the player. The coins-out meter 84*b* can be configured accumulate all value-out transactions from the EGM 2, such as from outgoing coin, bills, token, credit, paper token, hopper ticket, printed ticket voucher and virtual ticket voucher transactions, paid out for a) awards and b) credits from awards that are wagered. Thus, when a virtual ticket voucher is issued from the EGM 2, the coins-out meter 84*b* can be updated by some amount depending on the value of the virtual ticket voucher. Devices, such as but not limited to a coin-hopper (not shown), wireless interface 18 and printer 38 can generate the value-out transactions. The coins-out meter 84*b* may include credits that are accumulated on the jackpots-paid meter 84*d*.

The game controller 50 can be configured to update the coins-dropped meter 84*b* in response to value-out transactions for the casino. The coins-dropped meter 84*d* can accumulate 1) all coins and tokens that have been diverted into a drop bucket and 2) bills, paper tokens, printed ticket vouchers and virtual ticket vouchers accepted by the EGM 2. Thus, coins-dropped meter 84*d* can be advanced when a virtual ticket voucher is accepted at the EGM 2.

The jackpots-paid meter 84*d* can reflect any single event award that is not paid out by the EGM 2. For example, depending on the amount of the jackpot, the EGM 2 may not be configured to dispense coins, issue a printed ticket voucher or issue a virtual ticket voucher above a certain value. In this situation, the payment of the jackpot amount can be handled by some other means, such as check from the casino. The jackpots-paid meter 84*d* may also include credits accumulated on the canceled credit meter. The canceled credit meter 84*e* can accumulate credits paid by means other than payouts from the devices on the EGM 2, such as the hopper, printer, bill hopper, wireless interface or jackpot payouts if the device has such credit provisions.

The game controller 50 can be configured to maintain a number of soft meters. The soft meters can be electronic equivalents to the hard meters where data is stored in a digital format. The soft meters can be designed to be maintained at all times even when the EGM 2 is not supplied with power. One type of memory that can be used for storing soft meter data is a non-volatile memory, such as a battery backed RAM. It may be possible to reset the soft meters. For instance, the non-volatile memory storing the soft meter data can be cleared to reset the soft meters. However, before it is implemented, this process may require approval from a gaming regulator. Further, the EGM 2 can be designed such that an error condition on the EGM 2, such as a power failure, doesn't cause the soft meters stored in non-volatile memory to be erased.

The EGM 2 can be configured to maintain soft meters that duplicate all or a portion of the quantities accumulated by the hard meters 84. For instance, the game controller 50 can maintain a soft coin-in meter 62. When duplicate values are accumulated on the soft and hard meters, the values accumulated over a particular time period on each type of meter should match. As described above, the soft meters that duplicate of the hard meters can be affected when virtual ticket vouchers are redeemed for credit on the EGM 2 or when virtual ticket vouchers are issued. For instance, the coin-in soft meter 62 and coins-dropped soft meter (not shown) can be updated in response to the successful redemption of a virtual ticket voucher. As another example, the coin-out soft meter (not shown) can be updated in response to a successful acceptance of virtual ticket voucher.

The game controller 50 can include an operator mode 58 where values of the soft meters can be read. The operator mode 58 includes the software logic that allows values of the soft meters to be gathered and then output. For instance, in operator mode, the game controller 50 can display the values of various soft meters to the main display. In some embodiments, the game controller 58 can be configured to periodically send values of the soft meters to a remote device, such as accounting server 70. In another embodiment, the soft meter values can be displayed via a secondary device. For instance, a player tracking unit with a display and a smart interface board (SMIB), coupled to the game controller 50 can be configured to retrieve soft meter data from the game controller 50 and display it to the player tracking display. As another example, a SMIB coupled to the game controller 50 can be used to store and report soft meter values to a remote device.

The EGM 2 can accumulate other quantities in the soft meters that are not accumulated by the hard meters 84. For instance, in one embodiment, the game controller 50 can maintain a voucher-in soft meter 64. The voucher-in soft meter 64 can record a total number of validated printed ticket vouchers and validated virtual ticket vouchers redeemed the EGM 2. Thus, the voucher-in soft meter 64 can be incremented by 1 each time a printed or virtual ticket voucher is redeemed. The voucher-out soft meter 66 can record a total number of printed ticket vouchers and virtual ticket vouchers issued from the EGM 2. Thus, voucher-out soft meter 66 can be incremented by 1 each time a printed ticket voucher or a virtual ticket voucher is issued from the EGM 2.

As another example, the game controller 50 can maintain a virtual ticket voucher-in soft meter 80 and a virtual ticket voucher-out soft meter 82. The virtual ticket voucher out meter can be advanced by 1 each time a virtual ticket voucher is issued from the EGM 2. The virtual ticket in meter can be advanced by 1 each time virtual ticket voucher is accepted by the EGM 2. Other soft meters (not shown) can include a total value of virtual ticket vouchers issued, a total value of virtual ticket vouchers and printed ticket vouchers issued, a total value of virtual ticket vouchers successfully redeemed and a total value of the virtual ticket vouchers and a printed ticket vouchers successfully redeemed. Thus, as virtual ticket vouchers are successfully redeemed and virtual ticket vouchers are successfully issued, these four soft meters can be incremented depending on values associated with each of the virtual ticket vouchers issued or redeemed. The game controller 50 can also report soft meter values including each time a soft meter is incremented to a remote device for cross validation accounting purposes.

Dispute Resolution

At certain times, a player can dispute a transaction that has occurred on an EGM. For instance, a player can dispute that the EGM 2 issued a virtual ticket voucher that didn't accurately reflect the credits that were on the EGM 2 at the time the virtual ticket voucher was issued. In another embodiment, the player can dispute that the credits associated with a virtual ticket voucher accepted at the EGM 2 were not properly credited to the EGM. In one embodiment, to allow for disputes involving virtual ticket vouchers, an operator activated dispute resolution mode can be provided on the game controller.

In one embodiment, to help with dispute resolution, the game controller 50 can maintain a virtual ticket voucher received stack 60 and a virtual ticket voucher issued stack 61. The virtual ticket voucher received stack 60 can include an electronic log of information associated with virtual ticket vouchers, such as time received, amount associated with the voucher, virtual ticket voucher number, when the virtual ticket voucher was issued, etc. In addition, the virtual ticket voucher received stack 60 can include images of virtual ticket vouchers redeemed and validated on the EGM 2. As described above, in one embodiment, when a virtual ticket voucher is received, the game controller 50 can be configured to render an image of the received voucher. Thus, the image that is rendered can also be saved to the virtual ticket stack 60. The virtual ticket voucher images can be saved with the time that they are received.

When placed in dispute resolution mode, the game controller 50 can be configured to display one or more of the saved virtual ticket voucher images at a time to a display, such as a main display on the EGM 2. In one embodiment, a virtual ticket voucher image is saved when the virtual ticket voucher is accepted. In another embodiment, an image of the virtual ticket voucher can be rendered on the fly based upon virtual ticket voucher information saved to an electronic log, such as a ticket format, ticket number, ticket amount, etc. The dispute resolution mode can provide an interface that allows the operator to scroll through the virtual ticket voucher received stack 60, such as in the order that the virtual ticket vouchers were received. In another embodiment, the dispute resolution mode can be configured to display virtual ticket voucher information, such as the amounts associated with each virtual ticket voucher received, in a non-image format. A benefit of displaying the information in an image format is that the customer may recognize the image of the voucher which can aid the dispute resolution process.

In another embodiment, data used to render a virtual ticket voucher can be saved. For example, if a standard format is used to render the virtual ticket received vouchers, the saved data may be the unique data associated with each virtual ticket voucher, such as an amount, ticket number, etc. As described above, a standard format to render the "virtual ticket vouchers received" can be selected so that it matches the format of printed ticket vouchers that are received. Thus, in the display resolution mode, the game controller 50 can be configured to render one or more virtual ticket vouchers in the "virtual ticket voucher received stack" 60 on the fly using the code for rendering the images of the virtual ticket vouchers and the virtual ticket voucher data stored in stack 60.

As described above, the format of the data associated with the virtual ticket vouchers and printed ticket vouchers can be the same. An advantage of using the same format is that the virtual ticket vouchers can be compatible with an existing cashless system providing redemption and issuance of printed ticket vouchers. The difference being that the electronic data for the virtual ticket vouchers remains in electronic form while the electronic data for the printed ticket vouchers is sent to a printer and added to a printed ticket. In the case of the received ticket vouchers, the data for the virtual ticket voucher is received electronically while printed ticket voucher data is read by some device (for instance, a bar-code scanner can read a bar code printed on the ticket, which can be used to reference ticket information stored a remote server). After data is read from the printed ticket voucher and the printed ticket voucher is redeemed, the received printed ticket voucher can stored to a bill voucher/stack, such as 54. Typically, the bill/voucher stack 54 is in a cash box secured within a main cabinet of the EGM 2.

In one embodiment, the game controller 50 can maintain a ticket voucher received stack, which includes ticket voucher data for ticket vouchers received in a virtual ticket format or received in a printed ticket format. The time at which each of the tickets is received can be stored in the stack so that the ticket voucher data can be retrieved in a time sequential order. In dispute resolution mode, the ticket voucher data for the printed ticket vouchers can be retrieved and rendered in the same way that virtual ticket voucher data is retrieved and rendered. The virtual ticket vouchers and the printed ticket vouchers can be rendered slightly differently, such as different color, to allow the format in which each type of ticket vouchers was received to be distinguished.

The issued virtual ticket voucher issued stack 61 can be maintained and accessed in the manner similar to the virtual ticket voucher issued stack 60. For instance, images of issued virtual ticket vouchers that have been rendered can be saved to memory or the virtual ticket voucher data of the issued vouchers can be saved to memory and later used to render images of virtual ticket vouchers that can be output to a display device. In one embodiment, an electronic ticket voucher issued stack can be maintained. The electronic ticket voucher issued stack can include ticket voucher data for ticket vouchers issued in a printed ticket voucher format or a virtual ticket voucher format. The game controller 50 can be configured to retrieve the ticket voucher data from the stack and render images of virtual ticket vouchers or printed ticket vouchers using the data. The rendered ticket voucher images can be output to a display device.

Retrofit

Figure 3A:
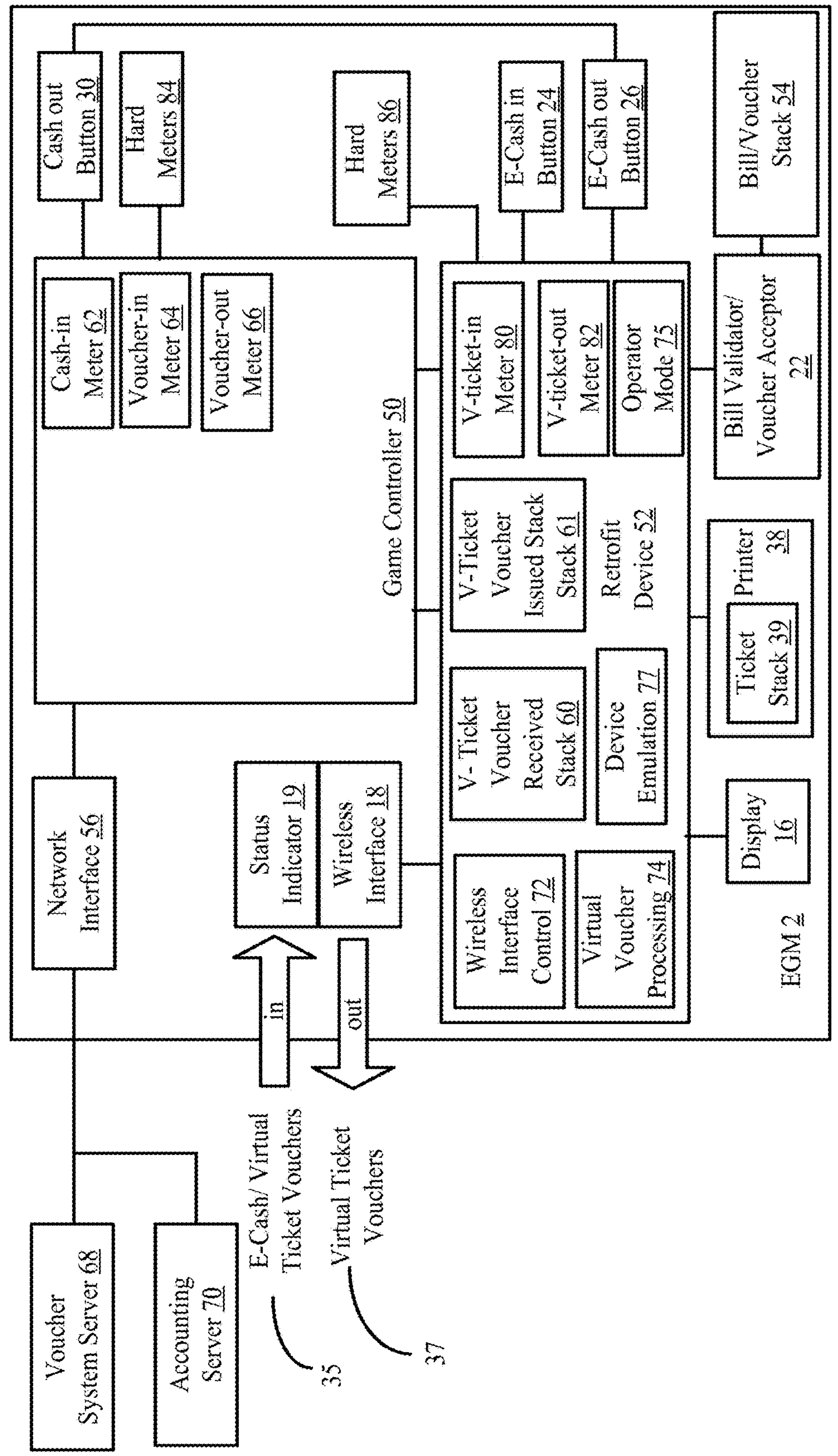
FIG. 3A is a block diagram of an electronic gaming machine including a retrofit device for providing virtual ticket-in and ticket-out services in accordance with the described embodiments.
Figure 3B:
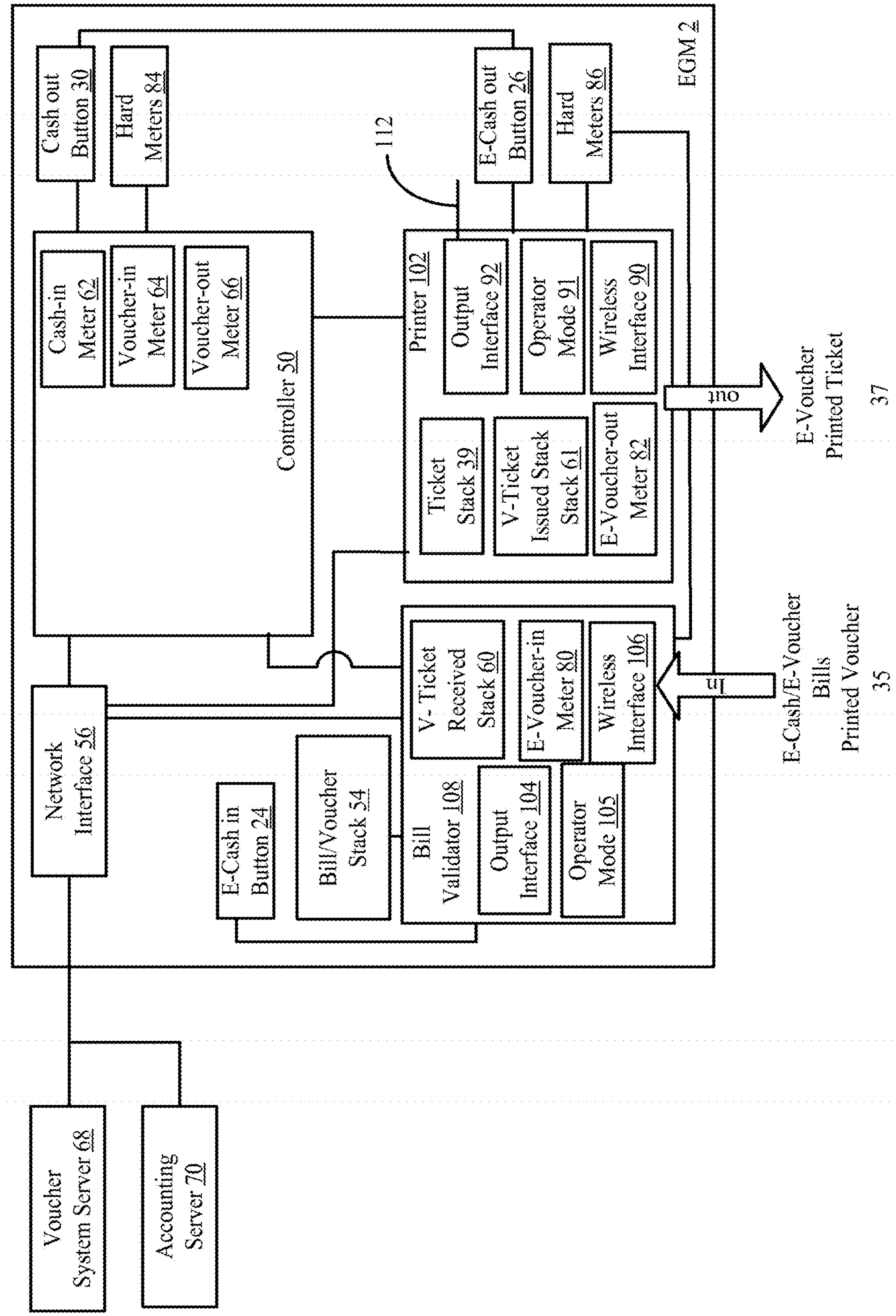
FIG. 3B is a block diagram of an electronic gaming machine including a bill acceptor and a printer for providing virtual ticket-in and ticket-out services in accordance with the described embodiments.

Next, with respect to FIGS. 3A and 3B, a number of retrofit embodiments are discussed. In the retrofit embodiments, a retrofit device can be coupled to an existing EGM 2 that doesn't provide virtual ticket voucher functionality to allow it to perform virtual ticket functions. In one embodiment, as described with respect to FIG. 3A, the retrofit device can be configured so that software on the game controller, a ticket printer and/or a bill/ticket acceptor doesn't need to be modified to allow virtual ticket voucher functionality to be provided. In this embodiment, the game controller, ticket printer and bill/ticket acceptor can communicate with one another as if the retrofit device is not present. Essentially, the retrofit device is invisible the devices in that each of the devices is unaware of the functions that the retrofit device is performing In another embodiment, as described with respect to FIG. 3B, a device on the EGM, such as a card reader, player tracking unit, ticket printer and/or bill/ticket acceptor, can be replaced with a substitute device that performs all or a portion of the virtual ticket vouchers functions. As an example, an existing printer that generates only printed ticket vouchers can be replaced with a printer that is configured to print ticket vouchers or issue virtual ticket vouchers. In another example, an existing bill/ticket acceptor can be replaced with a new bill/ticket acceptor that is configured to receive bills, printed ticket vouchers and virtual ticket vouchers.

As described above, a printer and/or bill validator can be configured with virtual ticket functions where the game controller is aware of the functionality. For instance, the game controller can be configured to command the printer to print a virtual ticket voucher to issue a virtual ticket voucher and expect an acknowledgement that the virtual ticket voucher has been issued from the printer. For a retrofit of an EGM where the game controller was designed without virtual ticket voucher functionality, the game controller may not have the capability to issue commands associated with virtual ticket vouchers or receive and parse acknowledgements associated with virtual ticket vouchers from a secondary device, such as a printer with virtual ticket voucher functionality. Thus, as is described in more detail below, the interactions between a retrofit device and a game controller, such as a retrofit printer with virtual ticket voucher functionality, can be different than in the instance of a printer with virtual ticket voucher functionality where the game controller is configured to utilize the virtual ticket functionality.

FIG. 3A is a block diagram of an electronic gaming machine 2 including a retrofit device 52 for providing virtual ticket-in and ticket-out services. The retrofit device 52 can be configured and installed such that the game controller 50, the printer 38 and the bill validator/acceptor do not require software modifications. The retrofit device 52 can be configured to perform virtual voucher processing 74 and provide the wireless interface control 72 as described with above respect to FIGS. 1 and 2.

The retrofit device 52 can be configured to accept virtual ticket vouchers, issue virtual ticket vouchers or combinations thereof. Further, it can be configured to maintain soft meters, such as the v-ticket-in meter 80 and the v-ticket-out meter 82 and other meters as described above. Thus, the retrofit device 52 can include a processor and memory for updating the software meters and a non-volatile memory for storing the soft meter values. The retrofit device 52 can be configured to report soft meter values to a remote device via a wired or wire communication interface associated with the retrofit device 52 or available on the EGM 2. Like the soft meters maintained in the game controller 50, the soft meters maintained by the retrofit device can be configured to be generally non-resettable. However, the retrofit device 52 can be configured to reset the soft meters after approval is received from a gaming regulator. For instance, the reset of the soft meters on the retrofit device 52 can be performed in the presence of a gaming regulator.

The retrofit device 52 can be configured to update a set of hard meters 86 separate from the hard meters 84 maintained by the game controller 50. For instance, the retrofit device 52 can be configured to update hard meter equivalents for one or more of the soft meters it maintains. In particular components, the hard meters can be integrated into the retrofit device 52. Like the embodiment described in FIG. 2, the retrofit device 52 can be configured to maintain a v-ticket voucher received stack 60 and a v-ticket voucher issued stack 61.

Further, as is described in more detail below, the retrofit device 52 can be configured with device emulation 77. The device emulation 77 can allow the retrofit device 52 to respond to game controller 50 as if it were another device on the EGM 2, such as the printer 38 and/or the bill validator 22. The user interface provided on the retrofit device can be different from either of the devices it is emulating. For instance, retrofit device that emulates a printer 38 and/or the bill validator may not include a slot for issuing ticket voucher or a slot for accepting ticket vouchers. Further, the retrofit device can include additional interface devices, such as a display, touch screen, graphical user interface, engraved or printed instructions or buttons, that aren't found on a typical bill validator or printer.

Next some details of the operation of the retrofit device are described. The E-cash in button and the E-cash out button 26 can be located somewhere on the player interface. For instance, an existing player input panel can be replaced with a retrofit player input panel that includes the E-cash in button 24 and the E-cash out button 26. In other embodiments, existing buttons on a player interface panel can be reprogrammed to provide these functions. In addition, the retrofit player input panel can include the wireless interface 18 and an expose a portion of the status indicator 19.

When the retrofit device 52 detects the E-cash in button 24 has been actuated, it can place itself in a state where it is ready to receive information associated with a virtual ticket voucher. For instance, it can activate wireless interface 18 so that it is ready to receive virtual ticket information from a portable electronic device and change a state of the status indicator 19 to indicate it is ready. If the status indicator includes a display than a message can be output to the display indicating the retrofit device is ready to receive virtual ticket voucher information. If the wireless interface is only left active for some time period, then the retrofit device 52 can initiate a countdown as was described above with respect to the EGM 2 to determine when to deactivate the wireless interface.

After the retrofit device 52 receives or recognizes the virtual ticket voucher information, the retrofit device, via the device emulation 77, can respond to the game controller 50 as if it were bill validator 22 that has accepted a printed ticket voucher. Towards this end, the retrofit device communications can be interposed on the communication link between the bill validator 22 and the game controller 50. Interposing the retrofit device on this communication link can involve inserting an adapter at one of the communication endpoints (i.e., at the bill validator or the game controller end) that routes the communications between the bill validator 22 and the game controller through the retrofit device.

When the retrofit device is activated to receive a virtual ticket voucher, such as after an actuation of the E-cash in button 24 is detected, it can notify the game controller in the same way as the bill validator 22 notifies the game controller 50 when a printed ticket has been detected as being inserted. After the virtual ticket voucher information is received, the retrofit device 52 can notify the game controller 50 on the bill validator communication link in the same manner as if information has been read from a printed ticket voucher. During this process, commands/acknowledgements sent from the game controller 50 to the bill validator 22 can be blocked from reaching the bill validator and instead can be processed and responded to by the retrofit device 52. If the virtual ticket voucher is validated, the game controller 50 will update its soft meters and hard meters as if a printed ticket voucher of some amount had been received by the bill validator. As described above, in a non-retrofit embodiment, the game controller 50 can be configured to update hard and/or soft meters associated with virtual ticket vouchers, such as a number of virtual ticket vouchers accepted and a value of the virtual ticket vouchers accepted.

If the virtual ticket voucher information is not validated and the game controller 50 sends a command to the bill acceptor 22 to reject a printed ticket (send it back out the ticket slot), then, the retrofit device 52 can receive the command and respond to the game controller 50 as if it has rejected a printed ticket. In one embodiment, the retrofit device 52 may have access to an interface, such as a display, that allows it to display a message that indicates the virtual ticket voucher is invalid. In another embodiment, the retrofit device 52 can be configured to change a state of the status indicator 19 to indicate the rejection of virtual ticket voucher. For instance, if so equipped, a light associated with the status indicator can flash red when the virtual ticket voucher is not accepted. In a bill validator, a physical ejection of the printed ticket voucher is used to indicate the printed ticket voucher has been ejected. In addition or alternatively, a rejection message or rejection indication can sent to a portable electronic device and the message or some indicator that the ticket voucher has been rejected can be output to the portable electronic device.

If the retrofit device 52 detects that the bill validator is initiating a transaction, such as when it has received a printed ticket voucher or a bill, it can allow communications between the game controller 50 and bill validator 22 to pass through. If the retrofit device 52 detects an actuation of the E-cash in button 24 before the transaction between the bill validator 22 and the game controller 50 is completed, the retrofit device 52 can be configured to ignore and not respond to the signal or the retrofit device 52 can be configured to wait to respond to the signal until it determines the transaction between the bill validator 22 and the game controller 50 is completed. For instance, a state of the wireless interface 18 and it associated status indicator 19 may not be changed until the transaction between the game controller 50 and the bill validator is completed. This sequence can occur if a user wishes to deposit credits via a printed ticket voucher and then deposit credits via a virtual ticket voucher.

Next, cash out transactions are described using the retrofit device 52. The E-cash out button 26 can be coupled to the retrofit device 52 and the game controller 50 via the communication path for the cash out button 30. Thus, when either the E-cash out button 26 or the cash out button 30 is actuated, the game controller can receive and process the signal as if the cash out button 30 has been actuated, i.e., the game controller 50 is not configured to distinguish that the signal was generated from the E-cash out button 26 or the cash out button 30. Then, when a signal is received from either button, the game controller 50 can respond in the same manner as if the cash out button has been activated. The game controller 50 can contact the validation server to receive ticket voucher information, such as a unique validation number for the ticket voucher that is to be issued. Then, the game controller 50 can generate and send instructions to the printer 38 to print a ticket voucher including the unique validation number.

The retrofit device 52 can be interposed on the communication path between the printer 38 and the game controller 50, such as in the manner described with respect to the bill validator. The retrofit device can be embodied physically as a separate device or logically within an existing device. The retrofit device 52 can receive the print instructions, activate the wireless interface 18 and change the status indicator 19. If a portable electronic device is detected and the virtual ticket voucher is transferred to the portable electronic device within some time period, the retrofit device 52 can respond to the game controller 50 as if it were the printer 38 and it had issued a printed ticket. If the retrofit device 52 doesn't issue the virtual ticket voucher within the time period, it can change the status of the wireless interface 18 and the status indicator 19 and release the initial print command to the printer 38 so that transaction is now processed as printed ticket. It can then allow subsequent communications between the printer 38 and the game controller 50 to pass through the retrofit device 52 so that the printed ticket voucher transaction can be completed.

When the retrofit device 52 receives a print voucher command from the game controller 50 and an actuation of the E-cash out button hasn't been detected, then the retrofit device 52 can be configured to allow communications between the game controller 50 and the printer 38 to pass through the retrofit device 52 until the printed ticket transaction is complete. In this example, the print voucher command can be initiated when a signal from an actuation of a cash-out button on the EGM 2 is detected. If the retrofit device detects an actuation of the E-cash out button 26 after the cash-out transaction has been initiated via the cash-out button, then the retrofit device 52 can be configured to ignore the E-cash out button because a printed voucher transaction has already been initiated. In alternate embodiments, the printer 38 and/or the bill validator can be removed from the EGM 2. In these embodiments, the retrofit device 52 can be configured to emulate the printer 38 and/or the bill validator to issue and/or receive only virtual ticket vouchers.

In one embodiment, the retrofit device 52 can be configured to report its virtual ticket voucher activity to a remote device, such as the validation server 68 or the accounting server 70. For instance, the retrofit device 68 can be configured to communicate which of the printed ticket voucher transactions initiated by the game controller 50 were actually completed as virtual ticket voucher transactions. Similarly, the retrofit device 52 can be configured to communicate to a remote device which ones of the redeemed ticket vouchers reported as being received in the bill validator 22 by the game controller 50 were actually virtual ticket vouchers. Similarly, if the retrofit device 52 is configured to accept virtual currency, such as via an e-wallet application, the retrofit device 52 can be configured to communicate to a remote device when virtual currency is accepted. This information would be useful for the soft count process since the virtual ticket vouchers or the virtual currency won't be in the cash box when the bills and printed tickets in the cash box are counted.

The retrofit device 52 can communicate with a remote device via the game controller 50 and the network interface 56 if the game controller 50 is configured to allow pass through communications from a device, such as 52. In another example, the retrofit device can be directly coupled to the network interface 56 if the network interface 56 allows for such communications and initiate communications through the network interface 56. In yet another embodiment, the retrofit device 52 can include its own communication interface, such as wireless communication interface, that allows it communicate with server 68 or 70 via some other communication pathway.

In FIG. 3A, the retrofit device 52 is shown as a separate device. In other embodiments, the functions of the retrofit device can be integrated into an existing device on the EGM 2. For instance, a card reader can be configured to perform the functions of the retrofit device 52. The card reader retrofit device can be configured perform communications in the manner described for the retrofit device 52. For instance, it can be interposed between the communication connections between the printer and the game controller and/or between the bill validator and the game controller. In addition, it can be configured to perform card reader functions. In particular embodiments, a wireless interface 18 and status indicator 19 can be provided near the card reader slot that allows access to the interior of the card reader such that the status indicator is visible to the player. In addition, an E-cash out button, such as 26 and an E-cash in button 24, can be provided near the card reader slot. The interface on the card reader including the status indicator, E-cash-in and E-cash out buttons and wireless interface can be arranged such the card reader can fit in an existing card reader slot associated with the EGM 2.

In another embodiment, the functions of the retrofit device can be incorporated into a player tracking unit. If desired, the wireless interface 18, the status indicator, the E-cash in button and/or the E-cash out button can be integrated into the player tracking interface. The cabinet of the EGM 2 includes an aperture that can be filled by the player tracking interface so that the features of the player tracking interface are accessible to a player. This feature can allow the player tracking unit with virtual ticket voucher in and virtual ticket voucher out capabilities to replace and fit in the space occupied by an existing player tracking unit without these capabilities.

As another example, the printer 38 or the bill validator 22 can be configured with the retrofit device functions. If the printer 38 is incorporated with all of the retrofit device functions, then the printer 38 can be configured to determine whether a ticket voucher is to be issued as virtual ticket voucher or a printed ticket voucher but respond to the game controller 50 as if all of the transactions were printed ticket vouchers. Thus, the existing connection between the game controller 50 and printer 38 may not have to be modified. However, to perform virtual ticket-in functions, the printer 38 can be interposed between the communication channel between the game controller 50 and the bill validator. As described above for the retrofit device, the printer 38 can be configured to block certain communications to the bill validator 22 and in some instances respond to the gaming controller 50 as if it were a bill validator.

In yet another example, if the bill validator 22 is incorporated with all of the retrofit device functions, then the bill validator can be configured to determine whether an accepted ticket voucher is a virtual ticket voucher or a printed ticket voucher but respond to the game controller 50 as if all of the transactions were printed ticket vouchers. The existing connection between the game controller 50 and bill validator may not have to be modified. However, to perform virtual ticket out functions, the bill validator can be interposed between the communication channel between the game controller 50 and the printer 38. As described above for the retrofit device, the bill validator can be configured to block certain communications to the printer 22 and in some instances respond to the gaming controller 50 as if it were a printer.

In yet other embodiments, the E-cash in button 24 and/or the E-cash out button 26 functions can be embodied on a portable electronic device. As an example, the EGM 2 can be configured to establish communications with the portable electronic device. After communications are established with the portable electronic device, an application executing on the portable electronic device can generate a touch screen button to initiate an E-cash in transaction or an E-cash out transaction. When portable electronic device detects one of the buttons has been selected, a message requesting the EGM 2 to initiate an E-cash in transaction or an E-cash out transaction can be sent to the EGM 2. The message can be received by the game controller or another device with a secondary controller, such as a player tracking unit, bill validator, printer or card reader, configured to respond to the message. In response to receiving the message and E-cash in transaction and/or an E-cash out transaction can be generated.

Thus, in particular embodiments, the EGM 2 may or may not include the E-cash in button 24 or the E-cash out button 26. In addition, the EGM 2 can include E-cash in button 24 and/or an E-cash out button 26 and can also be configured to receive a message from a portable electronic device requesting an E-cash in transaction or an E-cash out transaction. In this embodiment, the EGM 2 can initiate the E-cash in transaction in response to an actuation of the E-cash in button 24 or in response to receiving a message from a portable electronic device or some other remote device requesting the E-cash in transaction. Similarly, the EGM 2 can initiate the E-cash out transaction in response to an actuation of the E-cash out button 26 or in response to receiving a message from a portable electronic device or some other remote device requesting the E-cash out transaction.

In one embodiment, the remote device requesting the E-cash in or E-cash out transaction can be a remote server. The remote server can open up a "service window" on the EGM 2 that includes a touch screen button to initiate an E-cash in transaction or an E-cash out transaction. The remote server can receive an indication that the E-cash in button or the E-cash out button has been selected. In response, the remote server can send a message to the EGM 2 requesting an E-cash in transaction or an E-cash out transaction. In response, the gaming controller or a secondary controller on the EGM 2 that receives the request message can initiate the E-cash in transaction or the E-cash out transaction involving a portable electronic device.

Next embodiments are described where some of the retrofit device functions are split between secondary devices on an EGM, such as a bill validator and a printer. FIG. 3B is a block diagram of an electronic gaming machine including a bill acceptor and a printer for providing virtual ticket-in and ticket-out services. In FIG. 3B, although the virtual ticket functions are shown split between a bill validator and printer other combinations are possible. For instance, the virtual ticket functions can be split between a card reader and a player tracking unit or between a card reader and a printer. In addition, the functions allocated to each device can be different. For instance, in FIG. 3B, the printer 38 is described as handling virtual ticket out functions while the bill validator is shown as handling virtual ticket in functions. In alternate embodiments, these functions can be reversed between the devices. Thus, the example described with respect to FIG. 3B is provided for illustrated purposes and is not meant to be limiting.

In FIG. 3B, the bill validator 108 is configured to handle virtual ticket in functions. Thus, it can be configured to perform the processing associated with receiving virtual ticket vouchers. The processing can include maintaining and/or updating hard and soft meters. If the cash box includes a memory for storing records for received virtual ticket vouchers, then the bill validator 108 can be configured to update the memory with virtual ticket voucher information that is received.

In FIG. 3B, the bill validator 108 is configured as a retrofit device. Thus, the bill validator can be configured to report virtual ticket voucher transactions to the game controller 50 as a printed ticket voucher transaction. In one embodiment, the bill validator 108 can include communication capabilities, such as output interface 104 that allows the device to communicate virtual ticket voucher information to a remote device, such as server 68. In addition, the bill validator 108 can include an operator mode 105 that allows the bill validator to be interrogated for information, such as for its soft meter values associated with the virtual ticket vouchers. In one embodiment, via the output interface 104, this information can be displayed to a remote device, such as portable electronic device carried by an operator or to a display device coupled to the EGM 2. In a non-retrofit embodiment, this information can be reported to the game controller 50 and maintained as soft meters by the game controller 50. Thus, the operator mode 105 for displaying soft meter values may not be needed with a non-retrofit device but could be included as a back-up to the game controller 50 in some embodiments.

In one embodiment, the bill validator 108 can include one or more of a wireless interface 106, a status indicator (not shown) and the E-cash in button 24, built into the face of the bill validator including the slot for receiving bills. Alternatively, the bill validator 108 can be configured to receive a message from a portable electronic device or a remote server requesting an E-cash in transaction and may not include an E-cash in button 24. In this embodiment, the bill validator 108 can establish a communication session with the portable electronic device and/or a remote server and then receive the message requesting the E-cash in transaction from one of the devices.

The bill validator 108 can be configured to activate the wireless interface 106 and process information received via the wireless interface. Further, it can be configured to control the status indicator to indicate changes in state of the wireless interface 106, such as if the wireless interface is turned on or off. In a non-retrofit embodiment, when the E-cash in button 24 is included on the bill validator and it is actuated, the bill validator 108 can be configured to report the initiation of virtual ticket in transaction to the game controller rather than reporting it as a printed ticket-in transaction.

In FIG. 3B, the printer 102 is configured to handle virtual ticket out functions. Thus, it can be configured to perform the processing associated with issuing virtual ticket vouchers. The processing can include maintaining and/or updating hard and soft meters associated with the virtual ticket in functions. In FIG. 3B, the printer 102 is configured as a retrofit device. Thus, the printer 102 can be configured to report virtual ticket voucher transactions to the game controller 50 as printed ticket voucher transactions. However, the printer 102 can include communication capabilities, such as output interface 92 that allows the device to communicate virtual ticket voucher information to a remote device, such as server 68.

The printer 102 can include an operator mode 91 that allows the printer 102 to be interrogated for information, such as for its soft meter values associated with the virtual ticket vouchers that have been issued. As described above, the printer can include a non-volatile memory for maintaining the soft meters, such as battery-backed RAM, Flash or NV-RAM technologies. In one embodiment, via the output interface 92, this information can be displayed to a remote device, such as portable electronic device carried by an operator or to a display device coupled to the EGM 2. In a non-retrofit embodiment, this information can be reported to the game controller 50 and maintained as soft meters by the game controller 50. Thus, the operator mode 91 for displaying soft meter values may not be needed with a non-retrofit printer device but could be included as a back-up to the game controller 50.

In yet another embodiment, the printer 102 can include one or more of a wireless interface 91, a status indicator (not shown) and the E-cash out button 26, built into the face of the printer 102 including the slot for ejecting tickets that forms a portion of the EGM exterior. The printer can be configured to activate the wireless interface 90 and process information received via the wireless interface. Further, it can be configured to control the status indicator to indicate changes in state of the wireless interface 90, such as if the wireless interface is turned on or off. As described above, if the E-cash out button is included in the printer interface then the printer can be coupled to the communication channel associated with the cash out button, such that a cash-out signal is sent to the controller 50. The printer 102 can be configured to generate this signal. In response, the controller 50 can initiate a cash-out sequence where it is responding as if a printed ticket voucher is being generated. In non-retrofit embodiments where the controller 50 includes virtual ticket out functionality, the printer 102 can notify the game controller 50 that the E-cash out button 26 has been actuated and in response the game controller 50 can initiate and E-cash out transaction.

In the example described above, the bill validator 108 and the printer 102 each include separate wireless interfaces. If a NFC compatible interface was used, then as part of a virtual ticket in transaction, a portable electronic device might need to be placed near or in contact with the bill validator interface. In addition, as part of a virtual ticket out transaction, the portable electronic device might need to be placed near or in contact with the printer interface. Having to place the portable electronic device in different locations for each type of transaction reduces the required interfaces, thus, in one embodiment, two devices, such as a printer and a bill validator with virtual ticket out and ticket in capabilities can share a wireless interface and status indicator. However, it may be more intuitive for a user to place their device near a cash-in device for a cash-in transaction and near a cash-out device for a cash-out transaction. Thus, in some embodiments, separate wireless interfaces may be maintained.

In this embodiment, provisions may need to be made in regards to sharing control of the interface and status indicator. For instance, the wireless interface can communicate its status, i.e., whether it is in use or not. The bill validator and printer can be configured to respond to the case where the interface is being utilized by the other device and it wishes to initiate a transaction. For instance, after a virtual ticket out transaction is initiated on the printer 102, the printer might start controlling the shared interface. If the E-cash in button was pressed, the bill validator can attempt to control the interface but receive an indication from the wireless interface that it is busy. In response to the bill validator receiving an indication that wireless interface is busy, the bill validator can be configured to ignore the virtual ticket in request. In another example, it can be configured to hold the transaction in abeyance and continue to check the status of the wireless interface. When it detects the status of the wireless interface is inactive (i.e., the printer is not controlling the interface), it can initiate the virtual ticket in transaction on the wireless interface.

In other embodiments, only one of the devices and its associated functions can be included. For instance, an EGM can be configured with a retrofit printer device that can issue virtual ticket vouchers or printed ticket vouchers but is only able to accept printed ticket vouchers and thus, doesn't include a bill validator with the functions described above. In another example, the EGM can be configured with a retrofit bill validator that can receive virtual ticket vouchers or printed ticket vouchers but is only able to issue printed ticket vouchers and thus, doesn't include a printer with the functions described above.

Virtual Ticket Management

Figure 4B:
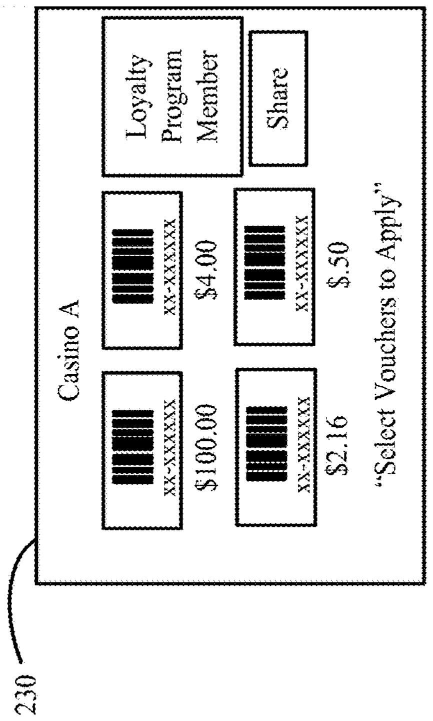
FIGS. 4B and 4C show block diagrams of an application for managing virtual tickets on a portable electronic device in accordance with the described embodiments.
Figure 4C:
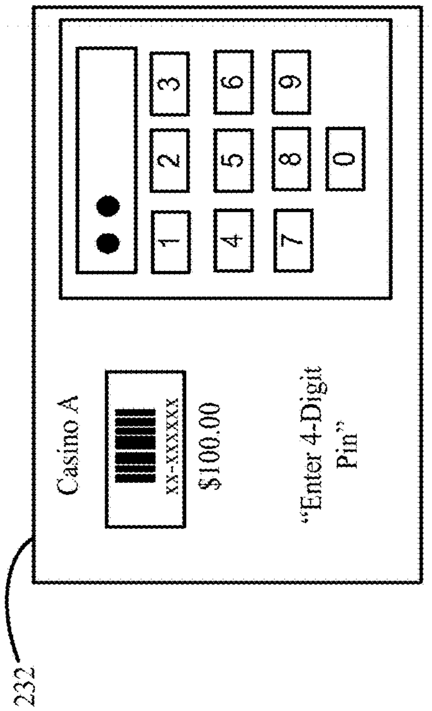
Figure 4A:
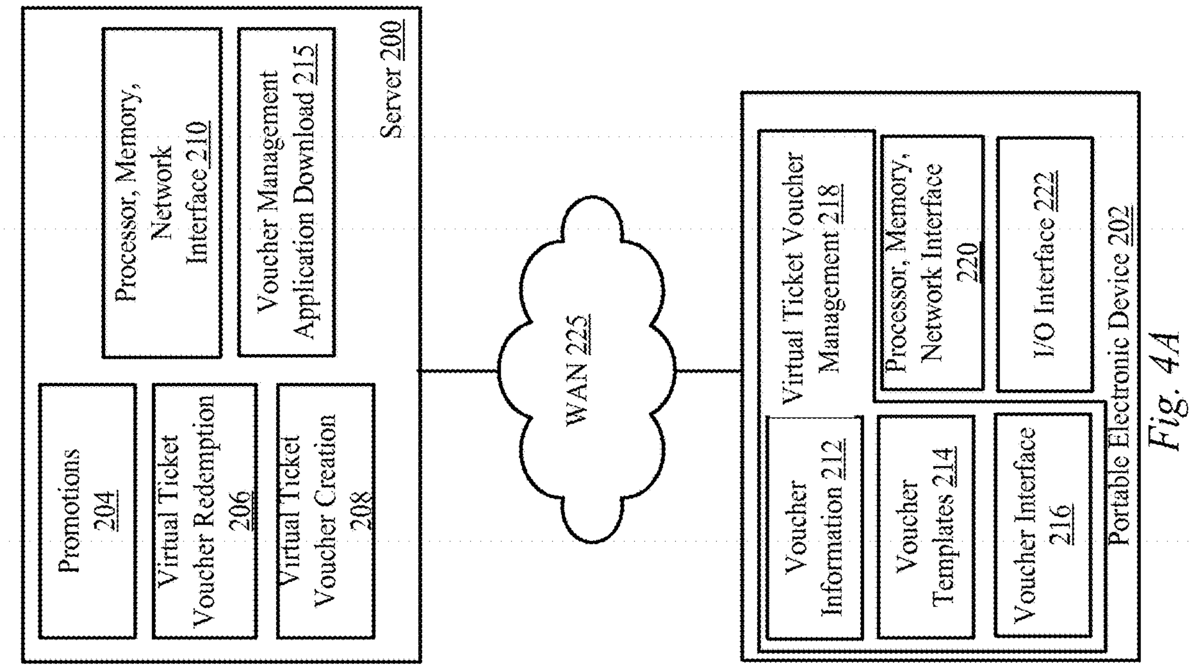
FIG. 4A shows a block diagram of a system including remote creation, validation and redemption of virtual tickets in accordance with the described embodiments.

With respect to the FIGS. 4A-4C, the management of virtual tickets on a portable electronic device is described. The management can include interactions with a remote server that allow virtual tickets stored on the portable electronic device to be redeemed or new virtual ticket vouchers to be created as well as other virtual ticket services to be provided. FIG. 4A shows a block diagram of a system providing remote creation, validation and redemption of virtual tickets in accordance with the described embodiments.

In one embodiment, the system includes a server 200 configured to communicate with remote devices, such as portable electronic device 202, via a WAN 225, such as the Internet.

The portable electronic device 202 can include a processor, a memory and a network interface 220. In addition, the portable electronic device can include a number of I/O interfaces 222. The I/O interfaces 222 can include visual and audio interfaces, such as displays, speakers, cameras, microphones, a touchscreen and an audio jack. The I/O interfaces 222 allow a user to interact with the portable electronic device including receiving video images and audio content associated with different applications executed on the portable electronic device. Further, the I/O interfaces 222 can include wired and/or wireless interfaces that allow the portable electronic device to communicate with other devices directly or via a network connection. Further, the portable electronic device 202 can include various a GPS receivers and various sensors, such as an accelerometer. The GPS receiver can be used for applications requiring a location. The accelerometer can be used to detect a movement of the device, which in some instances can used to generate control commands. As an example, the portable electronic device 202 can be a smartphone or a tablet computer, such as an iPhone™ or an iPad™ by Apple™.

As described above, the portable electronic device 202 can be used with virtual ticket vouchers. In particular, a virtual ticket voucher stored on the portable electronic device 202 can be transmitted to an EGM and validated to allow credit associated with the virtual ticket voucher to be deposited on the EGM. Also, a virtual ticket voucher generated by an EGM can be transmitted to the portable electronic device 202 to allow cash or credits to be transferred from the EGM to the portable electronic device. The virtual ticket voucher received by the portable electronic device from the EGM can later be used for game play on other EGMs, can be redeemed for cash at a cashier station or at a redemption kiosk, or can be converted into a virtual cash form compatible with an E-Wallet application.

In one embodiment, the portable electronic device 202 can be configured to execute a voucher management application 218 for managing virtual ticket vouchers. The voucher management application 218 can be downloaded from a remote device, such as server 200. A voucher management download application 215 on server 200 can be configured to download voucher management applications compatible with different operating systems, such as iOS™ by Apple™, Android™ by Google™, Windows 7 by Microsoft™ or QNX RTOS by RIM™. The different operating systems can be utilized by different types of portable electronic devices.

In other embodiments, the portable electronic device 202 can be implemented more simply. For instance, a smart card or an appropriately configured memory stick can be used to send virtual ticket vouchers to an EGM and receive virtual ticket vouchers from the EGM. For instance, a wired or wireless interface can be provided on the EGM to communicate with the memory stick. The EGM can detect the memory stick and display its contents related to virtual ticket vouchers to a display. On the display, such as a touch screen display, the user may be able to drag virtual ticket vouchers to a particular area associated with the EGM, such as a box rendered on the display, to redeem the vouchers and drag virtual ticket vouchers from an area associated with the EGM to an area associated with the memory stick to store the virtual ticket voucher to the memory stick.

The virtual ticket voucher management application can be configured to store virtual ticket voucher information 212 associated with unredeemed and redeemed virtual ticket vouchers. In one embodiment, the application 218 can be configured to manage account data associated with a loyalty program. Further, the application 218 can include voucher templates 214 that allow a user to customize the appearance of a virtual ticket voucher displayed on the portable electronic device 202. For instance, as described above, a virtual ticket voucher can be rendered in the format of a printed ticket voucher where via the voucher templates 214, the user can customize the rendered appearance of virtual ticket vouchers stored on the portable electronic device 202. In one embodiment, the ticket customization templates can be downloaded from a remote host, such as web-site affiliated with a casino or a gaming machine manufacturer.

In addition, the application 218 can provide a voucher interface 216. The voucher interface 216 can be configured to allow a user to organize, display and redeem their virtual ticket vouchers and manage loyalty program information. A few examples of an interface associated with the virtual ticket voucher management application are described with respect to FIGS. 4B and 4C. In one embodiment, the voucher management application can be configured to determine an expiration date associated with a virtual ticket voucher stored on the portable electronic device. When a virtual ticket voucher is near its expiration date, the interface 216 can be configured to send a notification message to the user, such as an alert message. An expiration policy for virtual ticket vouchers may vary from casino to casino. Thus, the application 218 can be configured to identify an establishment from which the virtual voucher was received and determine the expiration data for the virtual ticket voucher based upon the expiration policy associated with the establishment. In some instance, the expiration policy associated with virtual ticket voucher can be included in the virtual ticket voucher information that is received when a virtual ticket voucher is transferred to the portable electronic device. Thus, the application 218 can be configured to use this information in determining whether a virtual ticket voucher is about to expire.

In other embodiments, the virtual ticket management application 218 can be configured to communicate with a remote device, such as server 200, to receive other additional virtual ticket voucher services. For instance, server 200 can be configured to provide downloads including updates of the voucher management application 218 to remote devices, such as device 200. In one embodiment, the server 200 can include logic 208 that allows a virtual ticket voucher to be issued and transmitted to a portable electronic device 202. To perform this transaction, the server 200 can be configured to 1) contact a validation server that is utilized by one or more casino locations to receive unique voucher information, 2) construct a valid virtual ticket voucher, 3) confirm payment for the virtual ticket voucher, 4) transmit the virtual ticket voucher to the portable electronic device and 5) notify the validation server that the virtual ticket voucher has been issued. In addition, the server 200 can be configured to send device information associated with the portable electronic device 202, such as unique device information. In one embodiment, as described above, the validation server may require the unique device information to validate the virtual ticket voucher.

A restriction with the virtual ticket voucher issued by server 200 can be that the virtual ticket voucher has to be redeemed at the casino for which is valid. As will be described in more detail as follows, the server 200 can be configured to redeem the virtual ticket vouchers issued at a gaming property, such as a casino. In one embodiment, the server 200 may not validate tickets issued from the server 200. Another restriction can be the server 200 may not issue virtual tickets above a certain value, such as above $100 dollars.

Another type of virtual ticket voucher that can be purchased is a virtual ticket voucher redeemable for promotional credits. Promotional credits can be played on an EGM but can't be redeemed for cash. However, awards earned from wagers using the promotional credits can be redeemed for cash. As an example, the server 200 can be configured to allow a purchase $100 dollars worth of promotional credits for $50 dollars. This type of offer can offered in a group fashion, such as purchase $100 dollars worth of promotional credits for $50 if 50 people sign-up for the deal. The purchase of the promotional credits can be handled by the promotion application 204. To allow redemption of promotional credits, the server 200 can be configured to contact a validation server at a gaming property to receive a unique validation number that allows the promotional credits to be redeemed at the gaming property.

The server 200 can provide incentives to purchase a virtual ticket voucher that can redeemed for cash at a casino. For instance, as described in the previous paragraph, if a cash value virtual ticket vouchers is purchase for a certain value, the server 200 can be configured to issue a second virtual ticket voucher for promotional credits. As other incentives, the server 200 can be configured to issue virtual ticket vouchers that can be redeemed for discounts for services at a casino property, such as a discount at restaurant, a discount at a spa, a discount at a gaming property store or a discount on lodging. The amount of incentives provided with a purchase of virtual ticket voucher can be related to the value of the virtual ticket voucher purchased. In one embodiment, to receive a virtual ticket voucher redeemable for an incentive, such as a discount for lodging, a user may have to provide identification information. When identification information is provided, the redemption of the virtual ticket voucher redeemable for an incentive may be limited to a particular person associated with the identification information. The server 200 can store a record of the identification information associated with each virtual ticket voucher.

In other embodiments, the server 200 can be configured to provide virtual ticket voucher redemption 206. The server 200 can be configured to establish contact with a remote device, such as portable electronic device 202 and receive virtual ticket voucher information associated with a virtual ticket voucher stored on the portable electronic device that was transferred to the portable electronic device at a gaming property. After receiving the virtual ticket voucher information from the portable electronic device, the server 200 can be configured to contact a validation server 200 at the gaming property, transmit the virtual ticket voucher information and receive a confirmation in regards to whether the virtual ticket voucher is valid and hasn't been previously redeemed.

If the virtual ticket voucher is validated, then server 200 can be configured to provide the redemption value of the virtual ticket voucher to a user and notify a validation server that the virtual ticket voucher has been redeemed. For instance, the server 200 can be configured to mail a check for the value of the virtual ticket. In another embodiment, the server can be configured to make an electronic funds transfer to an account specified by a user, such as PayPal™ account, a regular bank account or some other account accessible to the user.

In another embodiment, the user can have an account on server 200 where virtual ticket vouchers can be stored. The account can be set up to automatically redeem and transfer funds associated with the redeemed virtual ticket vouchers to a user's bank account. For instance, the account can be set-up to perform this action automatically 30 days after a virtual ticket voucher has been issued. In another embodiment, a voucher management application executed on a user's mobile device or a home computer can be configured to carry out this process (e.g., contact the server 200, request a redemption of a virtual ticket voucher and a transfer of funds to a user's bank account when the ticket is valid).

To encourage user's to redeem their virtual ticket vouchers at the gaming property where they were issued, limits can be set on when a virtual ticket voucher can be redeemed. For instance, on server 200, a virtual ticket voucher may not redeemable until it is close to its expiration date, such as week from expiring. Thus, a user would have to wait unit the virtual ticket voucher was about to expire to redeem on-line or else travel to the gaming property where it was issued to have it redeemed. In another example, the server 200 may not be configured to redeem virtual ticket vouchers over a certain amount, such as over $100 dollars.

In one embodiment, rather than redeeming virtual ticket vouchers, the server 200 can be configured to provide an extension of the expiration date. Thus, if a virtual ticket voucher was about to expire, via a portable electronic device, the user can send the virtual ticket voucher information to the server 200 and request and expiration date extension. In response, the server 200 can contact a validation server at a gaming property and request an extension. If granted, the validation server can transmit the new expiration date to the server 200 and then the server 200 can notify the user associated with the portable electronic device 202 of the new expiration date.

Next, a few details of a voucher management application executable on a portable electronic device, such as 202, are discussed. FIGS. 4B and 4C show block diagrams of an application for managing virtual tickets on a portable electronic device. In particular, FIGS. 4B and 4C show examples of interface output data, 230 and 232, associated with the voucher management application that can be output to the display of a portable electronic device.

In one embodiment, the voucher management application can be configured to display information associated with one or more virtual ticket vouchers. As previously described, the virtual ticket voucher information can be rendered in the format of printed ticket voucher. In one embodiment, the virtual ticket voucher can be rendered in a format that is consistent with the gaming property from which it was issued. In another embodiment, voucher management application can be configured with options, such as voucher format templates, that allow a user to customize the appearance of the virtual ticket vouchers rendered on the display of the portable electronic device. In some instances, all or a portion information can be transferred to a gaming device, such as an EGM. When virtual ticket voucher information is transferred to the EGM, the EGM can be configured to render an image of the virtual ticket voucher on one of its displays using the user-selected format parameters for the virtual ticket voucher.

If multiple virtual ticket vouchers are rendered on a display of the portable electronic device simultaneously, the size of each rendered voucher may be reduced and information associated with the rendered voucher may be difficult to see. Towards this end, the voucher management application can be configured to render information associated with rendered voucher, such as value amount, in a larger format than other information rendered in the image of the virtual ticket voucher. This data can be rendered separately from the image of the virtual ticket voucher, such as below the virtual ticket voucher. Further, the information can be rendered as plain text, such as in a spread sheet format, without image data. The voucher management application can include a feature that allows a user to select a format for displaying the data or can be configured to switch formats depending on the amount of data that needs to be displayed.

In one embodiment, a bar-code or other optically formatted image data (e.g., QR code) rendered in an image of a virtual ticket voucher can be used to redeem a virtual ticket voucher. For instance, at a cashier station a user can present their portable electronic device while it is displaying the bar-code. The cashier can scan the bar-code and the information can be sent to a remote server for validation purposes. If the virtual ticket voucher is valid, then the cashier can provide the value associated with the virtual ticket voucher to the person that presented the portable electronic device.

In a particular embodiment, the voucher management application can include print capabilities that allow an image of virtual ticket voucher to be printed out via a standard printer. In some instances, electronic gaming machines or other redemption devices can be configured to accept virtual ticket vouchers printed in this manner A user may wish to print out a record of a previously redeemed ticket. For instance, the user can print out a ticket associated with a large payout as a souvenir. If desired, a water mark or some other indication can be added to a redeemed ticket when it is printed to indicate it has already been redeemed.

The voucher management application can be configured to manage virtual vouchers from multiple locations. The application can be configured to group the vouchers according to location. As shown in FIG. 4B, four virtual ticket vouchers from casino “A” are displayed. The voucher management application and a redemption device, such as an EGM or a redemption kiosk can be configured to allow multiple virtual ticket vouchers to be redeemed at once. For example, the user can select 3 or the 4 virtual ticket vouchers in FIG. 4B and then initiate a redemption transaction with an EGM. The selected vouchers can be transmitted simultaneously and the can be separately validated by the EGM. Each of the validated virtual ticket vouchers can be redeemed for credits on the EGM. The application can be configured to keep a record of each voucher redeemed including a value of the voucher, when it was redeemed and where it was redeemed. Images of the redeemed vouchers can be removed from the portable electronic device or can be organized separately from the virtual ticket vouchers that are still redeemable.

The voucher application can be configured to allow the user to optionally share their loyalty program information during the virtual ticket voucher transaction. For instance, if the user actuates the share button, then their loyalty program information can be uploaded to a redemption device, such as an EGM, during the virtual ticket voucher transaction. If the share button is not selected, then the virtual ticket voucher transaction can occur anonymously.

In some instances, the redemption device, such as an EGM, can be configured to require secondary authentication of a virtual ticket voucher. In another example, this feature can be built into the virtual voucher management application. For instance, as shown in interface 232 in FIG. 4C, the application or EGM can require the user to enter a 4-digit PIN for secondary authentication purposes. In another example, the application or EGM can require the user to enter a password. In yet another example, the user can be required to correctly answer one or more challenge questions. In another embodiment, the application or EGM can receive and verify biometric information.

In one embodiment, a second authentication may only be required for transactions above a certain amount, such as $25 dollars. If multiple virtual ticket vouchers are simultaneously redeemed, then the total amount of the transaction based on the value of all of the virtual ticket vouchers being redeemed during the transaction may have to be over a certain amount before secondary authentication is required. An advantage of requiring secondary authentication is that if the portable electronic device is lost or stolen another person may not be able to redeem the virtual ticket vouchers. The voucher management application can be configured to allow a user to back-up their virtual ticket voucher information on another device controlled by the user or a remote storage device in the “cloud.” Thus, using the back-up data, it may be possible for the user to recover and redeem their virtual ticket vouchers if a portable electronic device storing the virtual ticket vouchers is lost or stolen.

In another embodiment, the voucher management application can be configured to convert a physically printed ticket voucher to a virtual ticket voucher. For instance, on a device with a camera, an image can be taken of the printed ticket voucher. The application can be configured to parse information from the printed ticket voucher to create a virtual ticket voucher. Later, the virtual ticket voucher associated with printed ticket voucher can be redeemed for cash or additional game play on a gaming device.

The user can save the printed ticket voucher if desired. If the printed ticket voucher is redeemed before the virtual ticket voucher copy, then a later attempt to redeem the virtual ticket voucher copy will not work because the host system will already have a record that the ticket voucher has been redeemed. If the virtual ticket voucher copy is redeemed before the printed ticket voucher, then a later attempt to redeem the printed ticket voucher will not work because the host system will already have a record that the ticket voucher is redeemed.

In particular embodiments, a gaming device can be configured to issue both a printed ticket voucher and a virtual ticket voucher. The user receiving the printed ticket voucher and the virtual ticket voucher (stored to a device) can then choose which format to use when redeeming the ticket voucher. As an example, a retrofit device or a secondary device on an EGM, such as a card reader, player tracking unit, bill validator or printer, can be configured to issue a virtual ticket voucher when a printed ticket voucher is issued. Thus, the printed ticket voucher can issue normally in response to a cash out request. In addition, the retrofit device or the secondary device can be configured to issue a virtual ticket voucher and communicate the virtual ticket voucher information to a user's portable electronic device.

In yet other embodiment, the voucher management application can be configured to receive an image of a check. Software exists that allows an image of a check to be scanned or a user to take a picture of a check then have the check electronically deposited into a bank account. At a redemption station, rather than receiving cash for a redeemed virtual ticket voucher or a printed ticket voucher, an electronic image or images of a check that can be electronically deposited into a user's bank account can be received via the voucher management application on the user's device. Then, the check can be deposited into the user's bank account. This approach may be preferable to a user than receiving a large amount of cash.

Methods for Managing Virtual Ticket Vouchers on an EGM

Figure 5A:
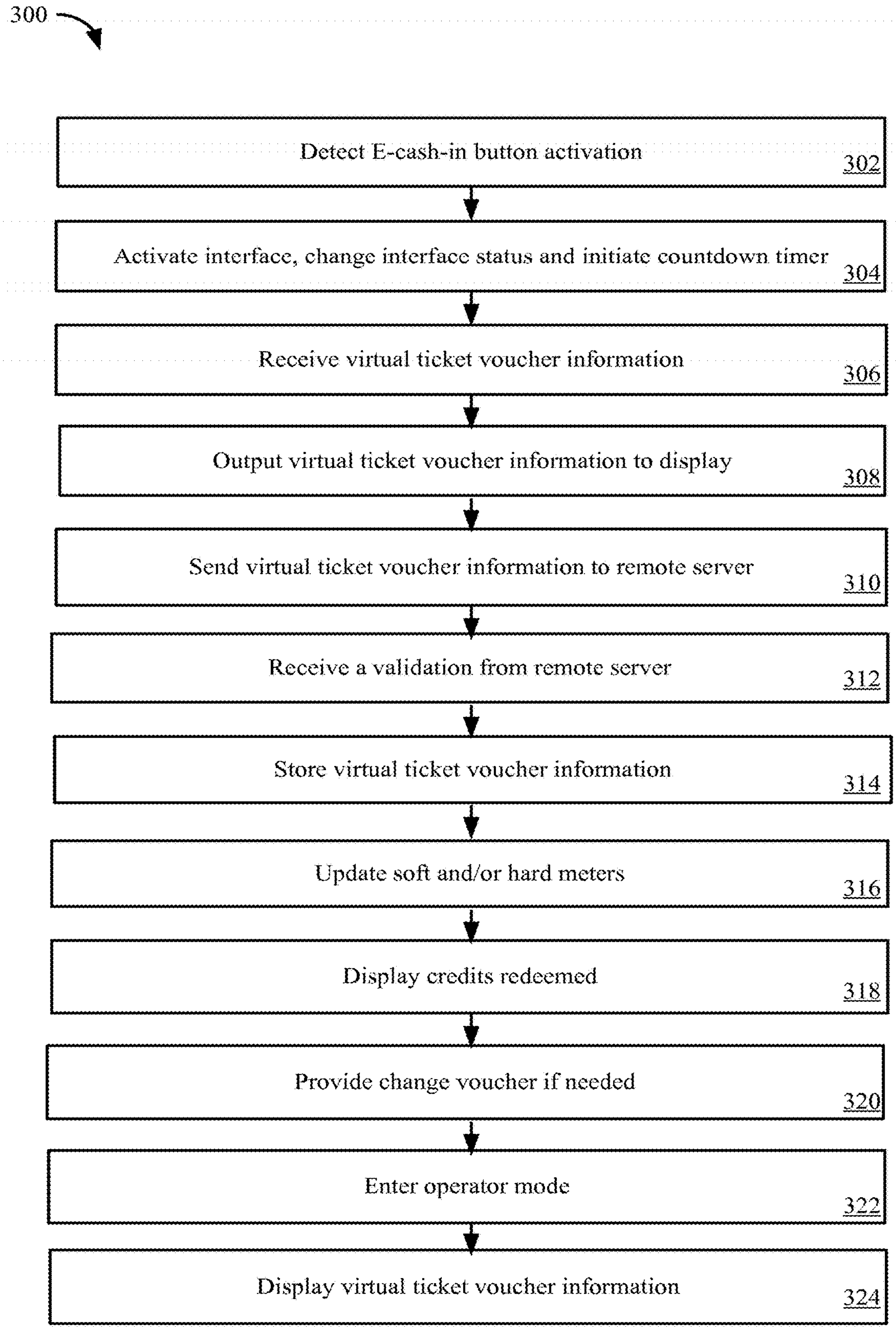
FIG. 5A is a method in a gaming machine for redeeming virtual ticket vouchers in accordance with the described embodiments.

Next with respect to FIG. 5A methods of managing virtual ticket vouchers in an EGM are described. FIG. 5A is a method 300 in a gaming machine for redeeming virtual ticket vouchers. In 302, an actuation of an E-cash-in button can be detected. In one embodiment, the E-cash-in button can be a mechanical or a touchscreen button. In another embodiment, a wireless communication, such as a near-field communication, between a portable electronic device and the EGM can be used to initiate the transaction. For instance, a user can wave their portable electronic device near a wireless interface to initiate the E-Cash-in transaction. In response to detecting the request for the E-cash-in transaction, the EGM can initiate a virtual voucher transaction. In one embodiment, the EGM can be configured establish communications with a portable electronic device. After communications are established, via the application, the application the user can initiate a virtual ticket voucher transaction. Thus, a mechanical button or touch screen button on the EGM may not be needed to initiate a virtual ticket voucher transaction.

In 304, in response, the EGM can initiate a virtual ticket voucher redemption transaction. In one embodiment, the EGM can be configured to activate an interface, such as a wireless interface enabling wireless communications and change the status of a status indicator to indicate the wireless interface is ready to receive virtual ticket voucher information from a portable electronic device. Then, the EGM can initiate a countdown timer. If the virtual ticket voucher information associated with the transaction within a specific time period, then the EGM can be configured to cancel the transaction. If a wireless interface and a status indicator are used, then the states of these devices can be changed. For instance, the wireless interface can be turned off and the state of the status indicator can be changed to indicate the wireless interface is inactive.

In particular embodiments, the wireless communications can be carried out using a wireless protocol, such as NFC, Bluetooth™ or Wi-Fi™. In one embodiment, a combination of wireless protocols can be used. For instance, an NFC communication can be used to set up a device pairing between the EGM and a portable electronic device that uses Bluetooth™ or Wi-Fi™ compatible communications.

In another embodiment, a wireless interface and status interface may not be used. Instead, via an application executing on a portable electronic device and a previously established communication connection between the EGM and the portable electronic device, the application can begin a transfer of virtual ticket voucher information to the EGM in response to receiving a selection initiating the transfer of virtual ticket voucher information. The selection can be made on an interface associated with the application that is generated on the portable electronic device. In 306, the EGM can receive virtual ticket voucher information from the portable electronic device. If the EGM includes a NFC compatible wireless interface and the portable electronic device is NFC enabled, then the portable electronic device has to be brought into range of the NFC compatible wireless interface, such as within 4 cm or less from the interface to enable the transaction.

In one embodiment, in 308, the EGM can be configured to output a portion of the virtual ticket voucher information to the display. The output of the virtual ticket voucher information can provide an indication that the virtual ticket voucher information has been received by the EGM 2. In a particular embodiment, the EGM 2 can be configured to render an image of a ticket voucher to the display including all or a portion the virtual ticket voucher information. The image can be rendered such that the image is similar in format to a printed ticket voucher. The application executing on the portable electronic device can include options, such as a number of ticket voucher templates, which allow a user to customize the appearance of virtual ticket vouchers rendered on the portable electronic device. In one embodiment, some of the custom appearance information selected by the user can be transferred from the portable electronic device to the EGM to affect an appearance of an image rendered and displayed on the EGM of the virtual ticket voucher. In another embodiment, the virtual ticket voucher appearance information can be retrieved from a loyalty program account when a user provides information, such a loyalty program account number. The information retrieved from the loyalty program account can be used to modify the appearance of virtual ticket vouchers rendered on a display of the EGM.

In 310, the EGM can send virtual ticket voucher information to a remote server for validation purposes. In one embodiment, the virtual ticket voucher information can include unique identification information associated with the portable electronic device. In 312, the EGM can receive an indication from the remote server that the virtual ticket voucher is valid for a particular value amount. In response, the EGM can redeem the virtual ticket voucher for an amount of credits equivalent to the value amount. The EGM can notify the remote device that the virtual ticket voucher has been redeemed and optionally notify the portable electronic device. If the EGM receives an indication from the remote server that the virtual ticket voucher is no longer valid, then the EGM can generate and output a notification message that indicates the virtual ticket voucher is invalid. The notification message can include one or more of 1) outputting a text message to a display on the EGM, 2) changing a state of a status indicator, such as a light array, 3) outputting a sound to an audio device on the EGM and 4) sending a message for output on the portable electronic device.

In 314, the EGM can be configured to store virtual ticket voucher information. In one embodiment, the EGM can store a rendered image of the virtual ticket voucher. In another embodiment, the EGM can update a memory coupled to a cash box with the virtual ticket voucher information. In 316, hard and soft meters affected by the redemption of the virtual ticket voucher can be updated including soft meters for accumulating a number of virtual ticket voucher accepted and a value of the virtual ticket vouchers accepted. In 318, the EGM can display the amount of credits or currency redeemed.

In 320, the EGM can generate a change voucher. If a value of the virtual ticket voucher redeemed results in a fraction of credit based upon a denomination used on the EGM, such as 75 cents remaining on a dollar denomination machine, then the EGM can issue a change voucher. The change voucher is typically issued in a currency amount equivalent to some fraction of a credit. In one embodiment, the EGM can issue a printed ticket voucher for the change amount. In another embodiment the EGM can issue a virtual ticket voucher for the change amount. Details of issuing virtual ticket vouchers are described as follows with respect to FIG. 5B as follows.

In 322, the EGM can enter into an operator mode. In one embodiment, the EGM can enter into an operator mode in response to an operator inserting an operator key. In 322, in operator mode, the EGM can be configured to display virtual ticket voucher information. For instance, the EGM can be configured to output values for soft meters associated with the virtual ticket vouchers. In another example, the EGM can be configured to display virtual ticket voucher information associated with virtual ticket vouchers accepted by the EGM. In one embodiment, the EGM can be configured to render images of the virtual ticket vouchers and/or printed ticket vouchers received at the EGM. The rendered images can be used for dispute resolution purposes. In particular embodiment, the EGM can be configured to receive portable device identification information, locate virtual ticket vouchers received from the portable electronic and display the virtual ticket voucher information to a display on the EGM or to a display on a portable electronic device carried by the operator.

FIG. 5B is a method 400 in a gaming machine for issuing virtual ticket vouchers on a gaming machine. In 402, the EGM can detect an activation of an E-cash out button. In various embodiments, the E-cash out button can be a mechanical button coupled to the player interface on the EGM, a touch screen button located on a display on the EGM or an input button on a portable electronic device in communication with the EGM, such as a touch screen button generated by an application executing on the portable electronic device. In response to detecting the activation of the E-cash out button, the EGM can initiate a countdown timer. In addition, in one embodiment, the EGM can be configured to activate a wireless interface on the EGM and change a status indicator to indicate the wireless interface is activated and ready to transmit virtual ticket voucher information from the EGM. In another embodiment, the EGM can already be in communication with the portable electronic device and the activation of the wireless interface and changing a state of the status indicator may not be necessary.

In 406, the EGM can request virtual ticket voucher information from the remote server. The request can include an amount for the virtual ticket voucher. The virtual ticket voucher information can include a unique ticket validation number and a ticket number. The ticket number can indicate that the ticket voucher is a virtual ticket voucher as opposed to a printed ticket voucher. In 408, the EGM can generate the virtual ticket voucher. In 410, the EGM can transmit virtual ticket information to the portable electronic device and receive information from the portable electronic device, such as device identification information. In one embodiment, if a near field communication interface is used, the transmission can require a user to bring the portable electronic device within a threshold distance of the interface for the transmission to take place. In 412, the EGM can send information received from the portable electronic device to the remote server, such as a portable device identification number. The device information can be associated with the virtual ticket voucher information stored on the remote device. In one embodiment, the device information can be used later in the redemption of the virtual ticket voucher. For instance, unless the correct device information associated with the virtual ticket voucher is received, the remote server won't validate the virtual ticket voucher.

In 414, the EGM can determine the countdown timer has expired and the virtual ticket voucher transaction is not been completed. In response, in 416, the EGM can generate a printed ticket voucher with a value amount the same as the virtual ticket voucher. The EGM may change the ticket number to indicate that a printed ticket voucher is being issued. In addition, the EGM can also notify the remote server that the ticket voucher was issued as printed ticket voucher and not a virtual ticket number. The remote server can change the ticket number associated with the printed ticket voucher to reflect the ticket voucher is a printed ticket voucher. In 418, the EGM can update various soft and/or hard meters depending on the type of ticket voucher issued (virtual or printed) and the value of the ticket voucher.

In 420, the EGM can enter an operator mode, such as for the purposes of reading the soft meters or for dispute resolution. In 422, the EGM can be configured to display virtual ticket voucher information associated with previously issued virtual ticket vouchers. In one embodiment, the EGM can be configured to display both virtual ticket information and printed ticket voucher information for previously issued ticket vouchers. The information can include device information, such as unique device identification information associated with a portable electronic device that received the virtual ticket voucher. In one embodiment, images of the virtual ticket vouchers that are formatted like a printed ticket voucher can be rendered to the display.

Next additional details of EGMs and gaming systems are described with respect to FIGS. 6 and 7. FIG. 6 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 7.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 7.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described.

These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, a receipt indicating the acceptance of a virtual ticket voucher or virtual currency on the gaming device can be displayed in the service window in a QR code format and transferred to a user's portable electronic device via an image capture device on their portable electronic device. In another embodiment, virtual ticket voucher information can be transferred to a portable electronic device as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 7 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 6, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 7, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 7 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention is claimed as follows:

1. A device comprising:

a first gaming communication protocol interface connectable to a gaming communication protocol interface of a game controller of an electronic gaming machine;

a second gaming communication protocol interface connectable to a gaming communication protocol interface of a smart interface board;

a network interface;

a processor that is distinct from the game controller of the electronic gaming machine and the smart interface board; and a memory device that stores a plurality of instructions that, when executed by the processor, cause the processor to:

following data associated with the electronic gaming machine being wirelessly communicated in association with a mobile device, receive, via the network interface, first data associated with an amount of funds to be associated with the electronic gaming machine, and communicate, to the game controller of the electronic gaming machine and via the first gaming communication protocol interface, second data that results in the game controller of the electronic gaming machine increasing a meter of the electronic gaming machine, wherein the increase of the meter of the electronic gaming machine occurs independent of any physical item which displays a monetary value being received via a payment acceptor of the electronic gaming machine.

2. The device of claim 1, further comprising a wireless communication interface.

3. The device of claim 2, wherein the memory device stores a plurality of further instructions that, when executed by the processor, cause the processor to receive, from the mobile device and via the wireless communication interface, data associated with a cashless wagering account.

4. The device of claim 1, wherein increasing the meter of the electronic gaming machine comprises causing the electronic gaming machine to increase a credit balance of the electronic gaming machine.

5. The device of claim 1, wherein increasing the meter of the electronic gaming machine comprises increasing a soft meter of the electronic gaming machine.

6. The device of claim 1, wherein the first data is received from a bonusing sever.

7. The device of claim 1, wherein the first data is associated with an electronic wallet linked to a bank account.

8. The device of claim 1, wherein the data wirelessly communicated in association with the mobile device further comprises player identification data.

9. The device of claim 1, wherein the memory device stores a plurality of further instructions that, when executed by the processor, cause the processor to block data communicated, via a payment acceptor communication link of the electronic gaming machine, from the payment acceptor of the electronic gaming machine to the game controller of the electronic gaming machine.

10. The device of claim 1, wherein the processor comprises one of: a controller of the payment acceptor of the electronic gaming machine, a player tracking unit controller, and a ticket printer controller of a ticket printer of the electronic gaming machine.

11. A device comprising:

a first gaming communication protocol interface connectable to a gaming communication protocol interface of an electronic gaming machine;

a second gaming communication protocol interface connectable to a controller of a payment acceptor of the electronic gaming machine;

a wireless communication interface;

a network interface;

a processor that is distinct from a controller of the electronic gaming machine; and a memory device that stores a plurality of instructions that, when executed by the processor, cause the processor to:

following data associated with the electronic gaming machine being wirelessly communicated in association with a mobile device, receive, via the network interface, first data associated with an amount of funds to be associated with the electronic gaming machine, and communicate, to the controller of the electronic gaming machine and via the first gaming communication protocol interface, second data that results in the controller of the electronic gaming machine increasing a meter of the electronic gaming machine, wherein the increase of the meter of the electronic gaming machine occurs independent of any physical item which displays a monetary value being received via the payment acceptor of the electronic gaming machine.

12. The device of claim 10, wherein increasing the meter of the electronic gaming machine comprises at least one of causing the electronic gaming machine to increase a credit balance of the electronic gaming machine and increasing a soft meter of the electronic gaming machine.

13. A method of operating a device, the method comprising:

following data associated with an electronic gaming machine being wirelessly communicated in association with a mobile device, receiving, via a network interface, first data associated with an amount of funds to be associated with the electronic gaming machine, and causing, by a processor and via a first gaming communication protocol interface connectable to a gaming communication protocol interface of a game controller of the electronic gaming machine, a communication of second data to the game controller of the electronic gaming machine which results in the game controller of the electronic gaming machine increasing a meter of the electronic gaming machine, wherein the processor is distinct from the game controller of the electronic gaming machine and a smart interface board having a gaming communication protocol interface connectable to a second gaming communication protocol interface, and the increase of the meter of the electronic gaming machine occurs independent of any physical item which displays a monetary value being received via a payment acceptor of the electronic gaming machine.

14. The method of claim 13, further comprising a wireless communication interface.

15. The method of claim 14, further comprising receiving, from the mobile device and via the wireless communication interface, data associated with a cashless wagering account.

16. The method of claim 13, wherein increasing the meter of the electronic gaming machine comprises causing the electronic gaming machine to increase a credit balance of the electronic gaming machine.

17. The method of claim 13, wherein increasing the meter of the electronic gaming machine comprises increasing a soft meter of the electronic gaming machine.

18. The method of claim 13, wherein the first data is received from a bonusing sever.

19. The method of claim 13, wherein the first data is associated with an electronic wallet linked to a bank account.

20. The method of claim 13, wherein the data wirelessly communicated in association with the mobile device further comprises player identification data.

21. The method of claim 13, further comprising causing the processor to block data communicated, via a payment acceptor communication link of the electronic gaming machine, from the payment acceptor of the electronic gaming machine to the game controller of the electronic gaming machine.

22. The method of claim 13, wherein the processor comprises one of: a controller of the payment acceptor of the electronic gaming machine, a player tracking unit controller, and a ticket printer controller of a ticket printer of the electronic gaming machine.

* * * * *